(12) United States Patent
Stolowitz

(10) Patent No.: US 6,237,052 B1
(45) Date of Patent: May 22, 2001

(54) ON-THE-FLY REDUNDANCY OPERATION FOR FORMING REDUNDANT DRIVE DATA AND RECONSTRUCTING MISSING DATA AS DATA TRANSFERRED BETWEEN BUFFER MEMORY AND DISK DRIVES DURING WRITE AND READ OPERATION RESPECTIVELY

(75) Inventor: Michael C. Stolowitz, Danville, CA (US)

(73) Assignee: NetCell Corporation, San Jose, CA (US)

( * ) Notice: Subject to any disclaimer, the term of this patent is extended or adjusted under 35 U.S.C. 154(b) by 0 days.

(21) Appl. No.: 09/411,698

(22) Filed: Oct. 1, 1999

Related U.S. Application Data

(62) Division of application No. 08/642,453, filed on May 3, 1996, now Pat. No. 6,018,778.

(51) Int. Cl.⁷ .............................. G06F 13/14; G06F 11/16
(52) U.S. Cl. ......................... 710/61; 714/764; 714/770
(58) Field of Search .............................. 710/21, 58, 61, 710/17; 714/6, 48, 770, 752, 764

(56) References Cited

U.S. PATENT DOCUMENTS

| | | | |
|---|---|---|---|
| 4,493,053 | 1/1985 | Thompson | 395/881 |
| 4,688,168 | 8/1987 | Gudaitis et al. | 363/96 |
| 5,111,465 | * 5/1992 | Edem et al. | 371/54 |
| 5,233,618 | * 8/1993 | Glider et al. | 714/820 |
| 5,274,645 | * 12/1993 | Idleman et al. | 371/10.1 |
| 5,289,478 | * 2/1994 | Barlow et al. | 371/40.1 |
| 5,404,454 | 4/1995 | Parks | 395/841 |
| 5,471,640 | 11/1995 | McBride | 395/842 |
| 5,477,552 | * 12/1995 | Nishiyama | 371/40.1 |
| 5,572,699 | 11/1996 | Kamo et al. | 711/114 |
| 5,617,432 | * 4/1997 | Eggenberger et al. | 714/752 |
| 5,638,518 | * 6/1997 | Malladi | 395/200.21 |
| 5,655,150 | * 8/1997 | Matsumoto et al. | 710/17 |
| 5,680,341 | * 10/1997 | Wong et al. | 365/45 |
| 5,696,933 | 12/1997 | Itoh et al. | 711/114 |
| 5,717,849 | * 2/1998 | Brady | 714/2 |
| 5,721,953 | 2/1998 | Fogg, Jr. et al. | 395/841 |
| 5,724,539 | 3/1998 | Riggle et al. | 711/100 |
| 5,765,186 | * 6/1998 | Searby | 711/100 |
| 5,771,248 | * 6/1998 | Katayama et al. | 371/40.11 |

OTHER PUBLICATIONS

D. Patterson, et al. "A Case for Redundant Arrays of Inexpensive Disks (RAID)" (Univ. Cal. Report No. UCB/CSD87/391, Dec.1987).

* cited by examiner

Primary Examiner—Thomas Lee
Assistant Examiner—Thuan Du
(74) Attorney, Agent, or Firm—Stoel Rives, LLP; Micah D. Stolowitz

(57) ABSTRACT

A disk drive array controller and method carries out disk drive data transfers not only concurrently but also synchronously with respect to all of the drives in the array. For synchronous operation, only a single-channel DMA is required to manage the buffer memory. A single, common strobe is coupled to all of the drives for synchronous read and write operations, thereby reducing controller complexity and pin count. A ring-structure drive data bus together with double buffering techniques allows use of a single, common shift clock instead of a series of staggered strobes as required in prior art for multiplexing/demultiplexing buffer memory data, again providing for reduced controller complexity and pin count in a preferred integrated circuit embodiment of the new disk array controller. Methods and circuitry also are disclosed for generating and storing redundant data (e.g. "check" or parity data) "on the fly" during a write operation to a RAID array. Techniques also are disclosed for reconstructing and inserting missing data into a read data stream "on the fly" so that a disk drive failure is transparent to the host.

19 Claims, 14 Drawing Sheets

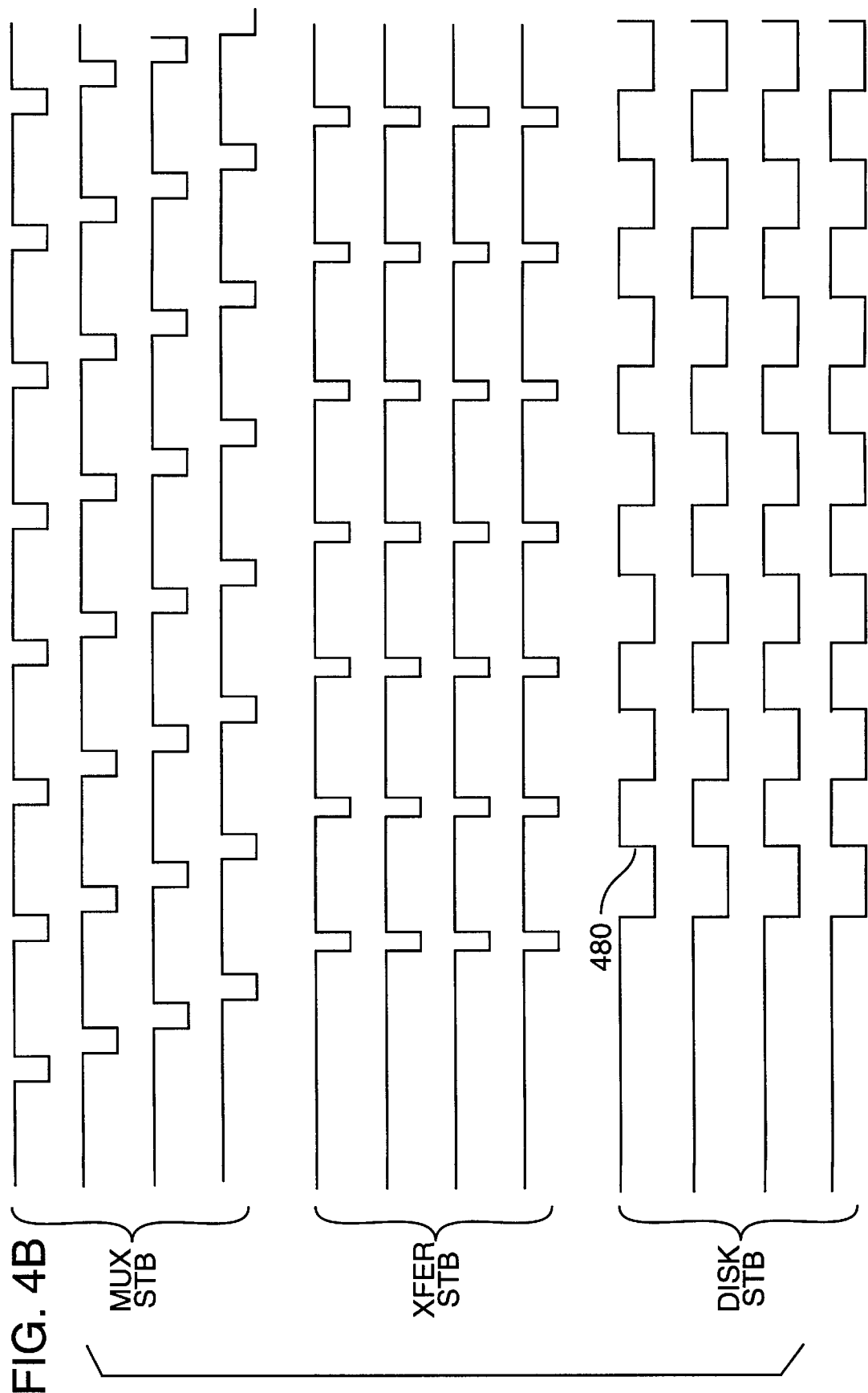

FIG. 10  DISK READ - NO CORRECTION

| State | INPUT | ACCUMULATOR(940) FUNCT | CONTENTS | HOLD LATCH | PIPELINE(902) | | | | | OUTPUT |
|---|---|---|---|---|---|---|---|---|---|---|
| 0 | A0 | LOAD | A0 | | | | | | | |
| 1 | B0 | XOR | A0+B0 | | A0 | | | | | |
| 2 | C0 | XOR | A0+B0+C0 | | B0 | A0 | | | | |
| 3 | D0 | XOR | A0+B0+C0+D0 | | C0 | B0 | A0 | | | |
| 4 | E0 | XOR | A0+B0+C0+D0+E0 | | D0 | C0 | B0 | A0 | | |
| 0 | A1 | LOAD | A1 | A0+B0+C0+D0+E0 | E0 | D0 | C0 | B0 | A0 | A0 |
| 1 | B1 | XOR | A1+B1 | A0+B0+C0+D0+E0 | A1 | E0 | D0 | C0 | B0 | B0 |
| 2 | C1 | XOR | A1+B1+C1 | A0+B0+C0+D0+E0 | B1 | A1 | E0 | D0 | C0 | C0 |
| 3 | D1 | XOR | A1+B1+C1+D1 | A0+B0+C0+D0+E0 | C1 | B1 | A1 | E0 | D0 | D0 |
| 4 | E1 | XOR | A1+B1+C1+D1+E1 | A0+B0+C0+D0+E0 | D1 | C1 | B1 | A1 | E0 | E0 |
| 0 | | | | A1+B1+C1+D1+E1 | E1 | D1 | C1 | B1 | A1 | A1 |
| 1 | | | | A1+B1+C1+D1+E1 | | E1 | D1 | C1 | B1 | B1 |
| 2 | | | | A1+B1+C1+D1+E1 | | | E1 | D1 | C1 | C1 |
| 3 | | | | A1+B1+C1+D1+E1 | | | | E1 | D1 | D1 |
| 4 | | | | A1+B1+C1+D1+E1 | | | | | E1 | |

FIG. 11  DISK READ -- WITH CORRECTION

| State | INPUT | ACCUMULATOR(940) | | HOLD LATCH | PIPELINE(902) | | | | | OUTPUT |
|---|---|---|---|---|---|---|---|---|---|---|
| | | FUNCT | CONTENTS | | | | | | | |
| 0 | A0 | LOAD | A0 | | A0 | | | | | |
| 1 | (xxx) | HOLD | A0 | | (xxx) | A0 | | | | |
| 2 | C0 | XOR | A0+C0 | | C0 | (xxx) | A0 | | | |
| 3 | D0 | XOR | A0+C0+D0 | | D0 | C0 | (xxx) | A0 | | |
| 4 | E0 | XOR | A0+C0+D0+E0 | | E0 | D0 | C0 | (xxx) | A0 | |
| 0 | A1 | LOAD | A1 | A0+C0+D0+E0 | A1 | E0 | D0 | C0 | (xxx) | A0 |
| 1 | (xxx) | HOLD | A1 | A0+C0+D0+E0 | (xxx) | A1 | E0 | D0 | C0 | B0 |
| 2 | C1 | XOR | A1+C1 | A0+C0+D0+E0 | C1 | (xxx) | A1 | E0 | D0 | C0 |
| 3 | D1 | XOR | A1+C1+D1 | A0+C0+D0+E0 | D1 | C1 | (xxx) | A1 | E0 | D0 |
| 4 | E1 | XOR | A1+C1+D1+E1 | A0+C0+D0+E0 | E1 | D1 | C1 | (xxx) | A1 | |
| 0 | | | | A1+C1+D1+E1 | | E1 | D1 | C1 | (xxx) | A1 |
| 1 | | | | A1+C1+D1+E1 | | | E1 | D1 | C1 | B1 |
| 2 | | | | A1+C1+D1+E1 | | | | E1 | D1 | C1 |
| 3 | | | | A1+C1+D1+E1 | | | | | E1 | D1 |
| 4 | | | | A1+C1+D1+E1 | | | | | | D1 |

ON-THE-FLY REDUNDANCY OPERATION FOR FORMING REDUNDANT DRIVE DATA AND RECONSTRUCTING MISSING DATA AS DATA TRANSFERRED BETWEEN BUFFER MEMORY AND DISK DRIVES DURING WRITE AND READ OPERATION RESPECTIVELY

RELATED APPLICATION

This is a division of application Ser. No. 08/642,453, filed May 3, 1996, now U.S. Pat. No. 6,018,778.

TECHNICAL FIELD

The present invention lies in the field of digital data storage and more specifically is concerned with disk drive controllers for multiple disk drives, generally known as disk drive arrays.

BACKGROUND OF THE INVENTION

Hard Disk Drives

Hard disk drives are found today in virtually every computer (except perhaps low-end computers attached to a network server, in which case the network server includes one or more drives). A hard disk drive typically comprises one or more rotating disks or "platters" carrying a magnetic media on which digital data can be stored (or "written") and later read back when needed. Rotating magnetic (or optical) media disks are known for high capacity, low cost storage of digital data. Each platter typically contains a multiplicity of concentric data track locations, each capable of storing useful information. The information stored in each track is accessed by a transducer head assembly which is moved among the concentric tracks. Such an access process is typically bifurcated into two operations. First, a "track seek" operation is accomplished to position the transducer assembly generally over the track that contains the data to be recovered and, second, a "track following" operation maintains the transducer in precise alignment with the track as the data is read therefrom. Both these operations are also accomplished when data is to be written by the transducer head assembly to a specific track on the disk.

In use, one or more drives are typically coupled to a microprocessor system as further described below. The microprocessor, or "host" stores digital data on the drives, and reads it back whenever required. The drives are controlled by a disk controller apparatus. Thus, a write command for example from the host to store a block of data actually goes to the disk controller. The disk controller directs the more specific operations of the disk drive necessary to carry out the write operation, and the analogous procedure applies to a read operation. This arrangement frees the host to do other tasks in the interim. The disk controller notifies the host, e.g. by interrupt, when the requested disk access (read or write) operation has been completed. A disk write operation generally copies data from a buffer memory or cache, often formed of SRAM (static random access memory), onto the hard disk drive media, while a disk read operation copies data from the drive(s) into the buffer memory. The buffer memory is coupled to the host bus by a host interface, as illustrated in FIG. 1 (prior art). Disk data is often buffered by another static ram cache within the drive itself. The drive electronics controls the data transfers between this cache and the magnetic media.

Disk Drive Performance and Caching

Over the past twenty years, microprocessor data transfer rates have increased from less than 1 MByte per second to over 100 megabytes per second. At the current speeds, hierarchical memory designs consisting of static ram based cache backed up by larger and slower SRAM can utilize most of the processor's speed. Disk drive technology has not kept up, however. In a hard disk drive, the bit rate of the serial data stream to and from the head is determined by the bit density on the media and the RPM. Unfortunately, increasing the RPM much above 5000 causes a sharp drop off in reliability. The bit density also is related to the head gap. The head must fly within half the gap width to discriminate bits. With thin film heads and high resolution media, disks have gone from 14" down to 1" diameter and less, and capacities have increased from 5 MBytes to 20 GBytes, but data transfer rates have increased only from 5 to about 40 MBits per second which is around 5 MBytes per second. System performance thus is limited because the faster microprocessor is hampered by the disk drive data transfer "bottleneck".

The caching of more than the requested sector can be of advantage for an application which makes repeated accesses to the same general area of the disk, but requests only a small chunk of data at a time. The probability will be very high that the next sector will already be in the cache resulting in zero access time. This can be enhanced for serial applications by reading ahead in anticipation before data from the next track is requested. More elaborate strategies such as segmenting and adaptive local cache are being developed by disk drive manufacturers as well. Larger DRAM based caches at the disk controller or system level (global cache) are used to buffer blocks of data from several locations on the disk. This can reduce the number of seeks required for applications with multiple input and output streams or for systems with concurrent tasks. Such caches will also tend to retain frequently used data, such as directory structures, eliminating the disk access times for these structures altogether.

Various caching schemes are being used to improve performance. Virtually all contemporary drives are "intelligent" with some amount of local buffer or cache, i.e. on-board the drive itself, typically in the order of 32K to 256K. Such a local buffer does not provide any advantage for a single random access (other than making the disk and host transfer rates independent). For the transfer of a large block of data, however, the local cache can be a significant advantage. For example, assume a drive has ten sectors per track, and that an application has requested data starting with sector one. If the drive determines that the first sector to pass under the head is going to be sector six, it could read sectors six through ten into the buffer, followed by sectors one through five. While the access time to sector one is unchanged, the drive will have read the entire track in a single revolution. If the sectors were read in order, it would have had to wait an average of one half revolution to get to sector one and then taken a full revolution to read the track. The ability to read the sectors out of order thus eliminates the rotational latency for cases when the entire track is required. This strategy is sometimes called "zero latency".

Disk Arrays

Despite all of the prior art in disk drives, controllers, and system level caches, a process cannot average a higher disk transfer rate than the data rate at the head. DRAM memory devices have increased in speed, but memory systems have also increased their performance by increasing the numbers of bits accessed in parallel. Current generations of processors use 32 or 64 bit DRAM. Unfortunately, this approach is not directly applicable to disk drives. While some work has been done using heads with multiple gaps, drives of this type are still very exotic. To increase bandwidth as well as storage capacity, it is known to deploy multiple disks operating in concert, i.e. "disk arrays". The disk array cost per MByte is optimal in the range of 1–2 GBytes. Storing larger amounts of data on multiple drives in this size range does not impose a substantial cost penalty. The use of two drives can essentially double the transfer rate. Four drives can quadruple the transfer rate. Disk arrays require substantial supporting hardware, however. For example, at a 5 MBytes per second data rate at the head, two or three drives could saturate a 16 MByte per second IDE interface, and two drives could saturate a 10 MByte per second SCSI bus. For a high performance disk array, therefore, each drive or pair of drives must have its own controller so that the controller does not become a transfer bottleneck.

While four drives have the potential of achieving four times the single drive transfer rate, this would rarely be achieved if the disk capacity were simply mapped consecutively over the four drives. A given process whose data was stored on drive 0 would be limited by the performance of drive 0. (Only on a file server with a backlog of disk activity might all four drives occasionally find themselves simultaneously busy.) To achieve an improvement in performance for any single process, the data for that process must be distributed across all of the drives so that any access may utilize the combined performance of all the drives running in parallel. Modern disk array controllers thus attain higher bandwidth than is available from a single drive by distributing the data over multiple drives so that all of the drives can be accessed in parallel, thereby effectively multiplying the bandwidth by the number of drives. This technique is called data striping. To realize the potential benefits of striping, mechanisms must be provided for concurrent control and data transfer to all of the drives. Most current disk arrays tend to be based on SCSI drives with multiple SCSI controllers operating concurrently. Additional description of disk arrays appears in D. Patterson, et al. "*A Case for Redundant Arrays of Inexpensive Disks (RAID)*" (Univ. Cal. Report No. UCB/CSD87/391, December 1987).

Reliability Issues

If a single drive has a given failure rate, an array of N drives will have N times the failure rate. A single drive failure rate which previously might have been adequate becomes unacceptable in an array. A conceptually simple solution to this reliability problem is called mirroring, also known as RAID level 1. Each drive is replaced by a pair of drives and a controller is arranged to maintain the same data on each drive of the pair. If either drive fails, no data is lost. Write transfer rates are the same as a single drive, while two simultaneous reads can be done on the mirrored pair. Since the probability of two drive failures in a short period of time is very unlikely, high reliability is achieved, albeit at double the cost. While mirroring is a useful solution for a single drive, there are more efficient ways of adding redundancy for arrays of two or more drives.

In a configuration with striped data over N "primary" (non-redundant) drives, only a single drive need be added to store redundant data. For disk writes, all N+1 drives are written. Redundant data, derived from all of the original data, is stored on drive N+1. The redundant data from drive N+1 allows the original data to be restored in the event of any other single drive failure. (Failure of drive N+1 itself is of no immediate consequence since a complete set of the original data is stored on the N primary drives.) In this way, reliability is improved for an incremental cost of 1/N. This is only 25% for a four drive system or 12.5% for an eight drive system. Controllers that implement this type of arrangement are known as RAID level 3, the most common type of RAID controllers. Redundancy in known RAID systems, however, exacts penalties in performance and complexity. These limitations are described following a brief introduction of the common drive interfaces.

The current hard disk market consists almost entirely of drives with one of two interfaces: IDE and SCSI. IDE is an acronym for "Integrated Drive Electronics". The interface is actually an ATA or "AT Attachment" interface defined by the Common Access Method Committee for IBM AT or compatible computer attachments. IDE drives dominate the low end of the market in terms of cost, capacity, and performance. An IDE interface may be very simple, consisting of little more than buffering and decoding. The 16-bit interface supports transfer rates of up to 16 MBytes per second.

SCSI is the Small Computer System Interface and is currently entering its third generation with SCSI-3. While the interface between the SCSI bus and the host requires an LSI chip, the SCSI bus will support up to seven "daisy-chained" peripherals. It is a common interface for devices such as CD-ROM drives and backup tape drives as well as hard disks. The eight-bit version of the SCSI-2 bus will support transfer rates up to 10 MBytes per second while the sixteen-bit version will support 20 MBytes per second. The available SCSI drives are somewhat larger than IDE, with larger buffers, and access times are slightly shorter. However, the data rates at the read/write head are essentially the same. Many manufacturers actually use the same media and heads for both lines of drives. ps Known Disk Arrays FIG. 1 illustrates a known disk array coupled to a microprocessor host bus 102. The host bus may be, for example, a 32-bit or 64-bit PCI bus. The host bus 102 is coupled through host interface circuitry 104 to a RAM buffer memory or cache 106 which may be formed, for example, of DRAM. Accordingly, data transfers between the host bus and the RAM buffer pass over bus 108. At the right side of the figure are a series of 5 disk drives, numbered 0–4. Each one of the disk drives is coupled to a corresponding controller, likewise numbered 0–4, respectively. Each of the controllers in turn is coupled to a common drive data bus 130 which in turn is coupled to the buffer memory 106. In general, for a write operation, data is first 30 transferred from the host to the RAM buffer, and then, data is copied from the RAM buffer 106 into the disk drives 0–4. Conversely, for read operation, the data is read from the drives via data bus 130 and stored in the RAM buffer 106, and from there, it is transferred to the host.

A DMA controller 140 provides 5 DMA channels—one for each drive. Thus, the DMA controller includes an address counter, for example 142, and a length counter, for example 152, for each of the five drives. The five address counters are identified by a common reference number 144 although each operates independently. Similarly, the five length counters are identified in the drawing by a common reference number 154. The address and length counters provide addressing to the RAM buffer. More specifically, each drive-controller pair requires an address each time it accesses the buffer. The address is provided by a corresponding one of the address counters. Each address counter is initialized to point to the location of the data stripe supported by the corresponding drive-controller pair. Following each transfer, the address counter is advanced. A length counter register is also provided for each drive. The length counter is initialized to the transfer length, and decremented after each transfer. When the counter is exhausted, the transfer for the corresponding controller-drive pair is complete and its transfer process is halted.

Thus it will be appreciated that in systems of the type illustrated in FIG. 1, the disk drives operate concurrently but not synchronously. Each of the drives includes internal electronics[1] (not shown) that will signal the corresponding controller when a requested sector has been written or read, as the case may be. For example, drive 0 is coupled to the corresponding controller 170. When drive 0 signals the controller 170, the controller begins to transfer that block via the data bus 130 into the RAM buffer as using an address provided by the corresponding DMA controller channel as noted above. Each of the controllers will arbitrate for access to the data bus 130 which is a shared resource. While these transfers are concurrent, they are not synchronous. Because of these random accesses to the RAM buffer, it is impossible to take advantage of DRAM page mode operation which would otherwise offer higher bandwidth at lower memory cost. That is not to say that the data transfers are asynchronous. The data bus arbitration and transfers may all be synchronous to some clock, but the data transfers will not start or finish at the same time. If the data has been striped, the requested disk access cannot be completed until all of the drives/controllers have completed their respective data transfers.

[1] The internal electronics on-board a disk drive are sometimes called the drive controller, but the term "disk drive controller" is used herein exclusively to refer to the apparatus that effects transfers between the disk drive electronics and the host (or memory buffer) as illustrated in FIG. 1. Drive electronics are not shown explicitly in the drawings as they are outside the scope of the invention.

Most current RAID controllers use SCSI drives. Regardless of the striping scheme, data from N drives must be assembled in a buffer to create logical user records. While each SCSI controller has a small amount of FIFO memory to take up the timing differences, an N-channel DMA with N times the bandwidth of any one drive is required to assemble or disassemble data in the buffer. For optimal system performance, this buffer must be dual ported with double the total disk bandwidth in order to support concurrent controller to host transfers. Otherwise, disk transfers would have to be interrupted during host transfers, and the reverse, so that each would operate only half the time for a net transfer rate of only half of the peak rate. The host transfers require an additional DMA channel to provide the buffer address. For these reasons, known N-channel DMA controllers are relatively large, complex and expensive devices.

The size and complexity of RAID controllers are aggravated by redundancy requirements. During a write operation, the data written to the redundant drive must be computed from the totality of the original data written to the other drives. The redundant data is computed during a second pass through the buffer (after writing the data to the primary or non-redundant drives), during which all of the data may be accessed in order. This second pass through the data essentially doubles the bandwidth requirements for the disk port of the RAM buffer. If surplus bandwidth is not available, the generation of redundant write data slows the write process considerably. This is rationalized as an appropriate solution in some applications since writes occur much less often than reads so that the impact on overall disk performance is much less than a factor of two, but there is a performance penalty in prior art to provide redundancy.

Moreover, in the event of a read error or a single drive failure, a second pass through read data in the buffer is again required to reconstruct and restore the missing data. Once again, this is rationalized as acceptable for some applications since the failure rates are low.

To briefly summarize, data transfer between an array of drives each with its own SCSI controller and a buffer memory may be concurrent, but it is not synchronous. The disk controllers in the prior art will begin and end their respective transfers at different times. For each controller there must exist an independent DMA channel with it own address pointer into the buffer memory and its own length counter. And due to data striping, a given record requested by the host cannot be returned until the last drive has completed its access. Additionally, in the prior art, redundancy requires either increased cost for higher bandwidth memory or reduced performance.

SUMMARY OF THE INVENTION

In view of the foregoing background, the need remains to improve disk array performance. It is an object of the present invention to provide improved disk array performance while reducing the cost and complexity of disk array controller apparatus. Another object of the invention is to reduce delays associated with handling redundant data in a RAID system. In the best case, there should be no performance penalty resulting from applying redundancy to improve disk array storage reliability. Important aspects of the invention include the following:

1. SYNCHRONOUS DATA TRANSFER

A first aspect of the present invention includes methods and circuitry for effecting synchronous data transfer to and from an array of disk drives. The synchronous data transfer techniques are applicable to any array of disk drives—IDE, SCSI, etc.—with or without a redundant drive. One advantage of the synchronous data transfer techniques described herein is the reduction of the required DMA complexity by a factor of N, where N is the total number of drives. The new disk array controller requires a DMA controller no more complex than that required for a single drive—i.e. only a single address counter and a single length counter—regardless of the number of drives in the array.

2. WIDE MEMORY BUFFER EXAMPLE

In one illustrative embodiment of the invention, it is applied to an array of N IDE drives. The data stripe is two bytes wide, the width of the IDE bus. The buffer memory width of the controller is 2×N bytes wide, the combined width of the IDE interfaces of the active drives. To execute a read operation, for example, a single, global read command comprising the starting sector number, the number of sectors to be read, and a "read sector" command type is "broadcast" to all of the drives at once. This information is written to a "command block" of registers in each IDE drive. Since data preferably is striped identically to all drives, the read command information is the same for all drives. This feature enhances performance by eliminating the time required to send commands to all of the drives sequentially. Writing to the command block of registers starts processing of the command in the drives.

After all of the drives are ready, i.e. the requested data is ready in each drive buffer, that data is transferred from all of the drive data ports to the buffer memory using a single sequence of common strobes which are shared by all of the drives. This is possible since the buffer access timing for the IDE interface is determined by the host adapter or controller end of the interface. Since the record requested by an application cannot be delivered until the last drive has finished reading its stripe, there is no performance penalty for waiting until all N drives have indicated that they have the requested data ready in their respective buffers as long as the data can be transferred at the maximum rate attainable by all of the drives. Each global read strobe will read two bytes from each drive and thus 2×N bytes from the N drives. This transfer corresponds to one "read cycle." The resulting word is stored in parallel ("broadside") into the controller's buffer memory. Following each buffer memory write, a single buffer address counter is incremented to point to the next 2×N byte word. Only a single-channel DMA is required. Continuing the above illustration, assuming 16 MByte transfer rate IDE drives for example, a two-drive array would transfer 32 MBytes per second into a 32-bit buffer, a four-drive array will transfer 64 MBytes per second into a 64-bit buffer, and an eight-drive array will transfer 128 MBytes per second into a 128-bit buffer.

3. MULTIPLEXED DATA AND DOUBLE BUFFERING

While a static ram memory buffer on the controller can easily handle the bandwidth described above, the buffer memory width (i.e. the buffer memory data port word size) required for four or more drives is expensive. In an alternative arrangement, the IDE data is multiplexed into a narrower but faster RAM. Individual read strobes to the N drives are staggered by 1/N of the read cycle. Alternatively, the same result can be achieved by using the trailing edge of the global read strobe to latch the read data. During the next read cycle, the contents of the latches are multiplexed onto a common data bus and written sequentially into the buffer memory. Since the buffer memory access remains sequential, only a single address counter is required. For the disk write, a staggered series of write strobes may be used to distribute the write data into a series of latches, one latch for each drive. The write data is then "broadside" hold the drive data stable through the write strobe, while the first set of latches are sequentially loaded again.

4. RING STRUCTURE DRIVE DATA BUS

Another embodiment of the invention is a disk array controller apparatus for accessing an array of disk drives, each disk drive having a corresponding data port, as before. In this arrangement, however, a series of latches are arranged serially so as to form a ring structure. Each latch has a tri-state output port coupled to the input port of the next latch in the ring. An arbitrary one of the latch output ports also is coupled to the RAM buffer data port for transferring data into the RAM. Data can be clocked around the ring with a single clock signal, similar to a shift register. Each of the ring latch output ports also is coupled to a corresponding bidirectional latching transceiver. Each of the latching transceivers, in turn, has a second port for connection to a corresponding one of the disk drive data ports.

In a disk write operation, data is first moved into the ring from the RAM buffer, by shifting the data around the ring until the ring is "loaded" with write data. For example, four 16-bit latches are loaded with a total 8-byte word. Then the ring data is transferred in parallel ("broadside") into the latching transceivers. The latching transceivers hold the data stable while it is copied into the drives in response to a write strobe. While that first 8-byte word is written to the drives (two bytes to each drive), the ring is loaded with the next 8-byte word of write data. In a read operation, a common read command is broadcast to all of the drives. When all of the drives are ready, data is transferred into all of the latching transceivers from all of the drives in parallel. Next the data is transferred, again in parallel, from the latching transceivers into the ring of latches. Finally, the data is stored in the RAM buffer by shifting it around the ring until the last byte pair is presented at the output of the ring latch coupled to the RAM buffer port. While that first 8-byte word of read data is transferring into the RAM, the next word of data is being transferred from the drives into the latching transceivers. These steps are repeated until the disk access requested by the host is completed. The ring structure has numerous advantages, including eliminating the need to synthesize staggered strobes, and providing disk array access operations using essentially only three control signals—a common disk strobe, a common transfer strobe, and a common ring clock—regardless of the number of disk drives in the array.

5. REDUNDANT DATA OPERATIONS

Given 2×N bytes of data in parallel, it is known to compute a redundant "check word". One approach is to XOR (boolean exclusive-OR operation) the corresponding bit positions of all of the words. Bit zero of the check word is computed by XORing the bit zeroes of the words from each of the N drives, bit one is computed by XORing the bit ones, and so on. In prior art, because the disk transfers are asynchronous relative to one another, computation of the redundant check word had to wait until all the data was in the buffer memory. Each word of the buffer has to be read back for the purpose of the calculation. This doubles the number of accesses and required RAM buffer bandwidth for a given data rate. If less than double bandwidth is available, the data transfer rate will suffer. Another aspect of the present invention provides for computing the redundant check word synchronously and "on the fly" from the serialized data stream. One example of an embodiment of this aspect of the invention is described as follows. When the word (two bytes) to be written to the first drive is fetched from the buffer, it is loaded into an accumulator. As the two bytes for each additional drive is fetched, it is XORed with the current contents of the accumulator and the result is put back into the accumulator. When the word for the last drive N has been fetched and XORed with the accumulator, the accumulator will be holding the redundant data word for the N+1 drive. The redundant word is written from the accumulator to the redundant drive. The required redundant data thus is produced on the fly without any performance penalty.

Another aspect of the invention includes methods and circuitry for reconstructing missing read data "on the fly". Missing data is reconstructed as the serial stream of read data moves from the drives into the buffer. Only complete, correct data is stored into the buffer according to the invention. No delay is incurred in the process. Hence a bad sector (corrupted or unreadable) or even an entire bad drive causes no special read delay. The failure is essentially transparent to the host machine. These features and advantages are made possible in part by transferring data to and from the disk drives not only concurrently but also synchronously.

To reconstruct missing data in the event of any single drive failure, the serialized read data stream is passed through an N+1 stage pipeline register. To begin, a word from the first drive is loaded into an accumulator and into the pipeline. As the next data word enters the pipeline from the next drive, it is XORed with the first word and the result stored in an accumulator. This process is repeated for each subsequent drive except that data from the failed drive is ignored. Once the data from the last (redundant) drive enters the pipeline, the accumulator will be holding the data from the missing drive. This result is transferred to a hold latch, and when the missing word in the pipeline from the failed drive is reached, the contents of the hold latch is substituted in place of the pipeline contents. A disk read with one drive failed is performed in a single pass of the data and without any performance penalty. Thus the drive failure is essentially transparent to the host, although it can be detected and logged for repair at a convenient time. Circuitry for forming redundant data, and circuitry for reconstructing missing data, can be conveniently inserted into the word-serial data stream on the disk drive side of the RAM buffer. A disk array controller as described herein preferably is implemented as an Application Specific Integrated Circuit ASIC for low cost volume production.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 4B is a timing diagram illustrating operation of the system of FIG. 5 for executing a disk write operation.

FIG. 10 is a state table illustrating operation of the circuitry of FIG. 9 in a disk read operation where data correction is not required.

FIG. 11 is a state table illustrating operation of the circuitry of FIG. 9 in a disk read operation including reconstruction of missing data.

DETAILED DESCRIPTION OF PREFERRED EMBODIMENT

Figure 1:
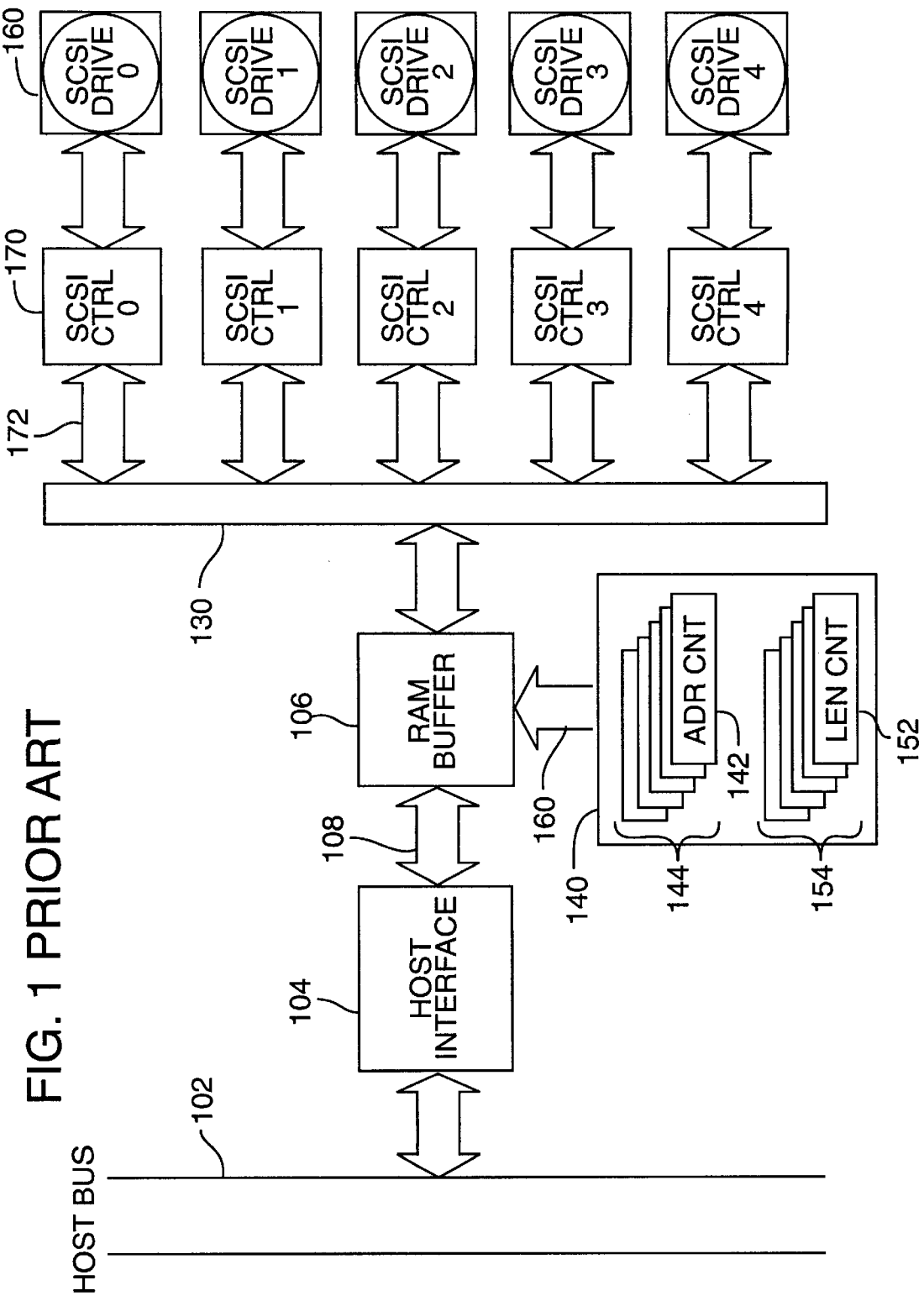
FIG. 1 is a hardware block diagram illustrating a prior art disk array system.
Figure 2:
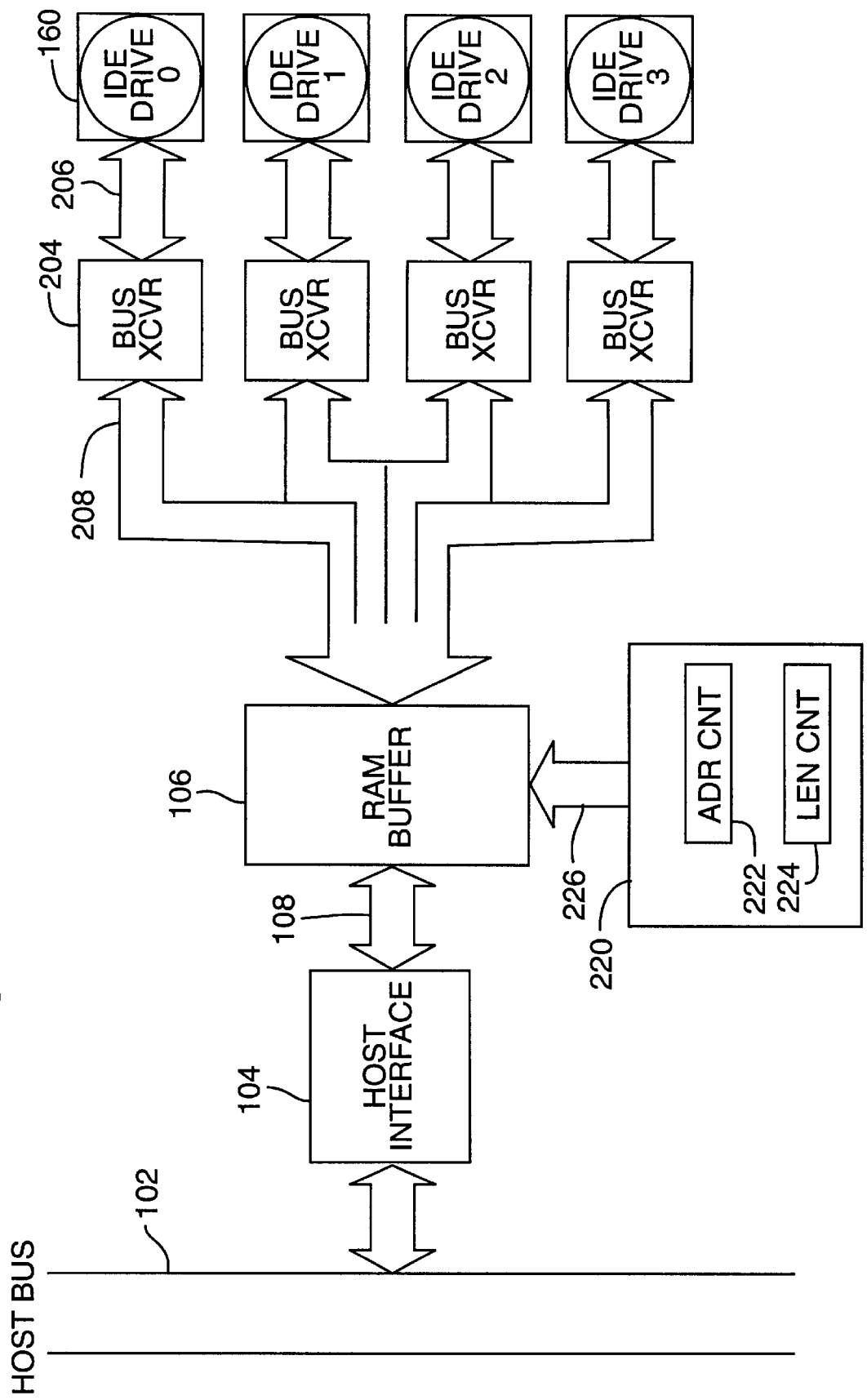
FIG. 2 is a hardware block diagram illustrating primary data paths in one embodiment of the present invention as applied to an array of IDE drives for synchronous data transfer.

FIG. 2 is a hardware block diagram illustrating one embodiment of the invention as applied to an array of IDE drives (0–3) so as to provide synchronous data transfer. The host bus 102, host interface 104 and RAM buffer 106 (also referred to herein as the "buffer memory" or "cache") were described with reference to FIG. 1 previously. In the system of FIG. 2, each of the disk drives, IDE drive 0 through IDE drive 3, is coupled to the RAM buffer 106 through a respective bus transceiver circuit having the same width as the drive interface (for example 16 bits or 2 bytes). For example, drive 0 is coupled to bus transceiver ("BUS XCVR") 204 via path 206 and bus transceiver 204 in turn is coupled via path 208 to the RAM buffer 106.

Support of the drive interfaces requires two types of information transfers, control and data. The data paths are shown in FIG. 2 as described. The control information shares 206—the drive data port, but does not come from the RAM. Another path, not shown, is required to initialize the control registers in the IDE drives.

Figure 3:
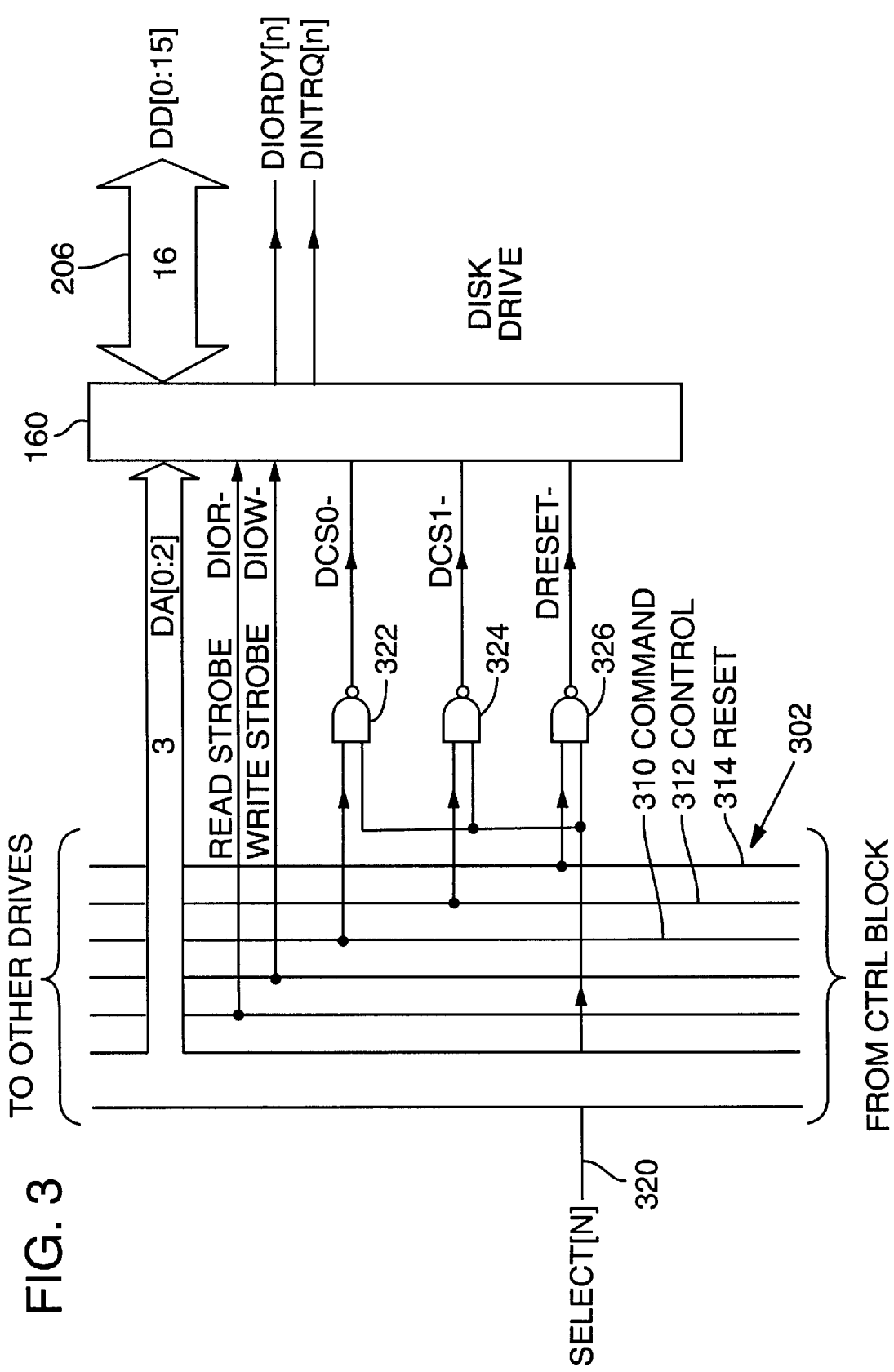
FIG. 3 is a schematic diagram illustrating control signal circuitry for interfacing with an array of IDE disk drives for synchronous operation, e.g. in a disk array system of the type illustrated in FIG. 5.

FIG. 3 is a schematic diagram illustrating control signals for interfacing with an IDE drive such as drive 160 in FIG. 2. The IDE drive interface is shown as box 160 in FIG. 3. A disk array control system "CTRL BLOCK" (not shown) provides a set of control signals that are common to all of the disk drives in the array. These control signals can be generated, for example, by a processor described later. The common control signals are indicated as control bus 302. The control bus signals include a 3-bit disk address DA[0:2], a disk read strobe DIOR- and a disk write strobe DIOW-, where the minus symbol (-) indicates active low signals. Each of these common control signals is connected to drive 160 as shown and in like manner to all of the other drives in the array.

The control bus 302 also includes a disk command signal 310, a disk control signal 312 and a disk reset signal 314. The control system further provides a unique drive select signal SELECT[N] for each drive. In FIG. 3, signal line 320 is the drive select signal corresponding to drive 160. The disk command signal 310 and the unique select signal 320 are input to a first NAND gate 322 to provide a unique chip select signal DCS0- to drive 160. Similarly, the disk control signal 312 and the individual select signal 320 are input to a second NAND gate 324 to provide a unique chip select signal DCS1- to the drive 160. Finally, the common disk reset signal 314 and the individual select signal 320 are input to a third NAND gate 326 so as to provide a unique drive reset signal DRESET- to the drive 160. The same arrangement using NAND gates (or equivalent logic) is provided for each of the drives in the array. In this arrangement, common control, command and reset signals form part of the control bus connected to all of the drives in the array. For each drive, these signals are qualified by the corresponding individual drive select signal. This strategy reduces the number of signal lines that must be routed from the control system to the disk drives and, where the control system is implemented as an integrated circuit, reduces the number of pins on the IC package.

Each disk drive interface provides a corresponding ready signal DIORDY and a corresponding interrupt request signal DINTRQ. The disk drive asserts its interrupt request signal to indicate that a requested read operation has been initiated, i.e., valid data is available on the drive data bus 206. In operation of the array as further explained below, the control system polls all of the disk drive interrupt request signals in order to determine when read data is available from all of the drives. An alternative "handshake" method uses DMARQ/DMACK signals. If enabled, the drive asserts DMARQ when ready to transfer data. When the controller is ready to receive it, it asserts DMACK (in place of a chip select) and then drives the strobes. The drive can throttle the process (start/stop it as necessary) by negating DMARQ instead of DIORDY. Either handshake protocol can be implemented in the array controller described herein.

Data "striping" across the drives is greatly facilitated by mapping identical portions of a block of data onto each drive, e.g. 50% on each of two drives, or 25% on each of four drives, etc. If the drives are identical in terms of sectors per track and the number of heads or surfaces, and the data from a given host block is mapped into the same logical position on each of the drives, then the disk commands will be identical and they can be broadcast, as further described later. Synchronous data transfer requires waiting for all drives to be ready to transfer, and then transferring blocks of data wherein each block consists of one element (a word in the case of IDE) from each of the drives. Synchronous data transfer can be either in parallel, as in FIG. 2, or serialized by a multiplexer, as will be discussed in connection with FIG. 5 below. In a write operation using the system of FIG. 2, a single continuous stream of write data from the RAM buffer 106 is striped on the fly to the array of drives simply by virtue of physical arrangement of the data bus lines. Conversely, in the read direction, the striped data from the drive is merged on the fly into a single contiguous stream for the cache. Only a single DMA channel 220, consisting of one cache address pointer 222 and length counter 224, is required to direct the transfer. This strategy represents a substantial savings in hardware over the arrangement illustrated in FIG. 1. Accessing the cache or RAM buffer 106 with a contiguous stream as opposed to random accesses has the further advantage of allowing the cache to make better use of a DRAM's page mode of operation thereby obtaining higher bandwidth at lower cost. Moreover, transferring data for all of the drives as a contiguous block allows the redundant data to be computed on the fly as will be explained later.

In the arrangement shown in FIG. 2, the RAM buffer 106 has a port width or word size equal to the sum of the IDE drive interfaces. As a practical matter, the total width of the data path from all of the drives will be greater than the width of the data path into the cache, which will often match the width of the host interface 108. Additionally, this arrangement is difficult to implement for a write operation, because of typical IDE drive write data setup and hold requirements. For these reasons, multiplexing and buffering of the disk drive data is preferred, as illustrated next.

Figure 5:
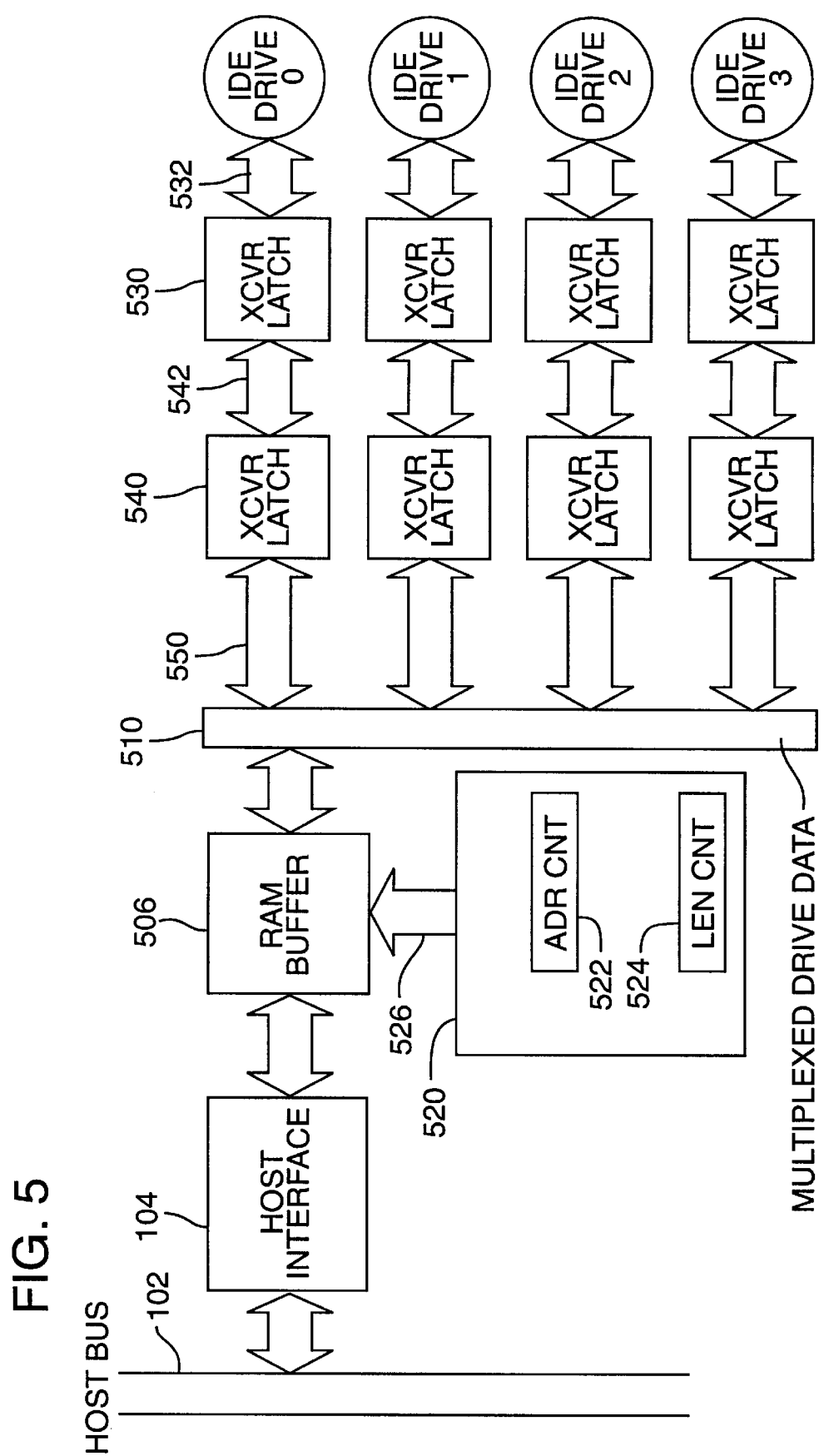
FIG. 5 illustrates an IDE disk array system with multiplexed disk drive data bus utilizing dual level transceivers according to another aspect of the invention.

Referring next to FIG. 5, an alternative embodiment of the invention incorporates multiplexed data transfers to the buffer. The arrangement shown in FIG. 5 is generally similar to that shown in FIG. 2, except that each of the bus transceivers (e.g. 204 in FIG. 2) is replaced with dual-level latching transceivers. Thus, for example, IDE drive 0 is coupled via bus 532 to a first bidirectional latching transceiver 530. Latching transceiver 530 in turn is coupled via bus 542 to a second bidirectional latching transceiver 540. Latching transceiver 540 is coupled via bus 550 to a multiplexed drive data bus 510, which in turn is coupled to the RAM buffer 506 data port. The term "coupled" is used herein to include direct or indirect connection of one node or port to another. For example, buffer circuits (not shown) may be included as appropriate for cable loading. In this arrangement, the buffer data port need only be as wide as each individual IDE drive interface. Data transfers to the buffer are time-multiplexed as described next.

Multiplexed Data Transfer Timing

Figure 4A:
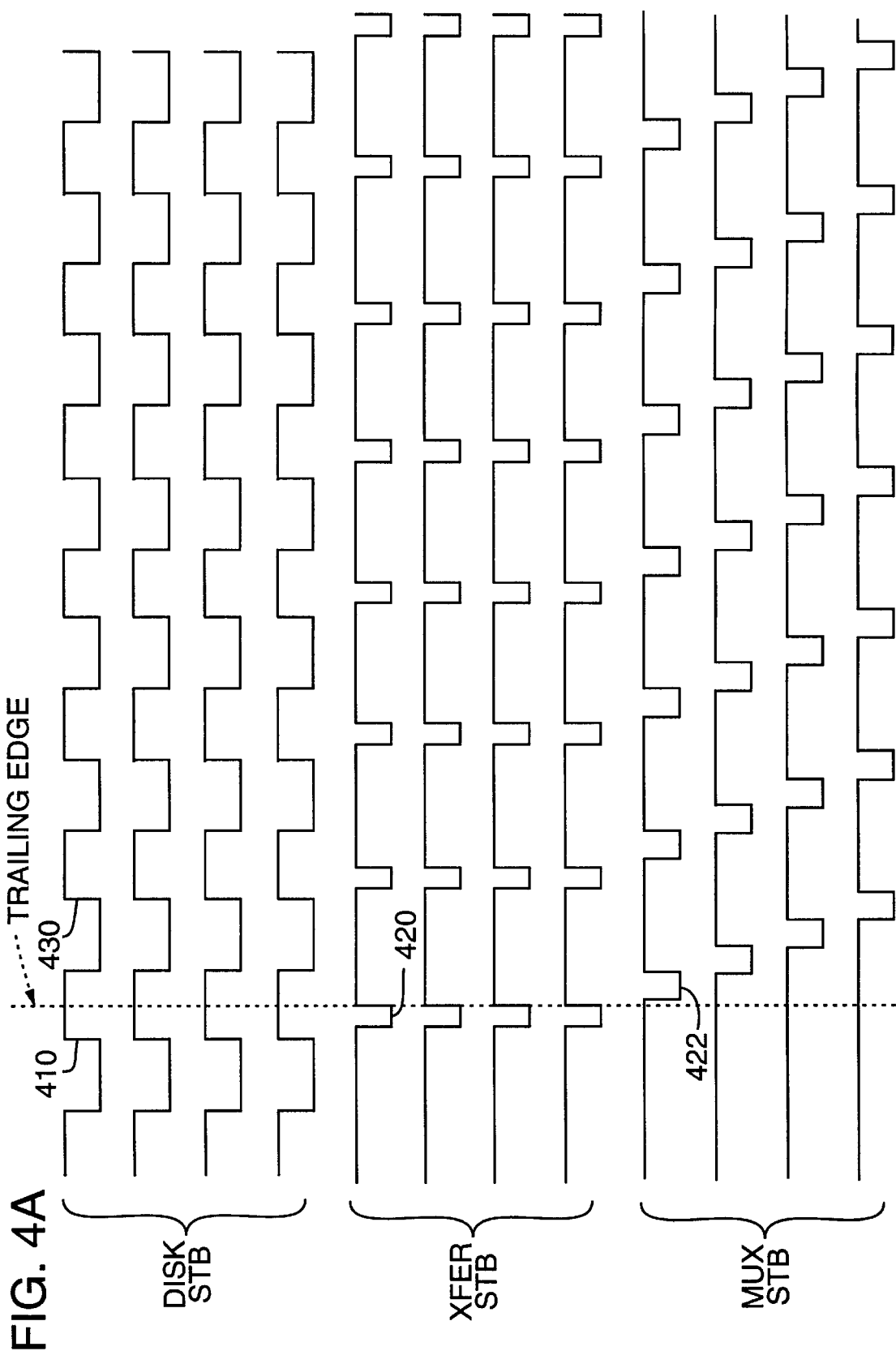
FIG. 4A is a timing diagram illustrating operation of the system of FIG. 5 for executing a disk read operation.

Referring now to FIG. 4A, the top part of the timing diagram, labeled "DISK STB" (disk strobe) shows a series of four read strobe signals, each directed to a corresponding one of the disk drives of FIG. 5. As noted above, one of the advantages of synchronous operation is that a single read strobe is common to all of the drives. Separate signals are shown here for illustration. The trailing edge of these strobes (e.g. 410) clocks read data from a given drive (e.g. drive 0) into its corresponding latch (530). This broadside load of the latches is not effected until all of the drives have indicated that read data is ready. (The read data is held ready in each drive's on-board buffer.)

The middle part of FIG. 4A, labeled "XFER STB" (transfer strobe), shows four strobes that clock the read data from the receiving latches (e.g. 530) into the multiplexing latches (e.g. 540). Again, since these strobes are identical, a single, common signal can be used to transfer all of the latch data at once "broadside". When the transfer strobe signal goes low, e.g. pulse 420, data is transferred "broadside" from each of the receiving latches into the corresponding multiplexing latches. The mux latches hold the data while it is multiplexed into the RAM buffer.

Finally, the lower portion of FIG. 4A labeled "MUX STB" (multiplexer strobe) shows a series of four staggered control signals, each coupled to a corresponding one of the multiplexing latches for sequentially transferring data onto the drive data bus 510. The data is multiplexed from the bus 510 into the RAM buffer 506 under control of the single-channel DMA controller 520 as described above. Note that data from all four latches is sequentially moved into the RAM during the time of a single disk strobe. While the first word of read data is being transferred into the buffer at mux strobe pulse 422, for example, the next read strobe 430 is issued to the drives to read the next word of data. By the time the next word(s) of data from the drives are ready, the first words have been sequentially stored in the RAM. This process is repeated continuously, as illustrated, until all of the read data requested in the read command has been transferred into the RAM. In some cases, caching strategies may call for reading multiple sectors or even entire tracks from the disk drives to implement a cache memory management scheme.

FIG. 4B illustrates a disk write operation using the hardware of FIG. 5. Here, the process FIG. 4A essentially is reversed. Staggered multiplexer strobes ("MUX STB") sequentially load the write data from the RAM buffer (data bus 510) into the multiplexer latching transceivers (e.g. 540). After all four latches are loaded, the write data is transferred broadside into the second set of latching transceivers, e.g. 530.

The process described may be done at relatively high speed. For example, at each one of the latter latches the data might need be present at the input for 15 ns. Thus all four latches are loaded in nominally 60 ns (i.e. 133 MBytes per second). Once all of the latches have been loaded, the data is broadside transferred into the output latches—see strobe 460. Next, a common write strobe signal is asserted to all of the drives, for example write strobe 480. The write data is held at the output latches for the time necessary, for example 125 ns, for the drives to carry out the write operation. While that is occurring, the input latches are loaded again, sequentially, strobes 442–448. After the last input latch is loaded 448, the first write operation to the drives has been completed, and the input latches are transferred broadside into the output latches as before, in response to control signals 462. Conceptually, for each drive, the read data path can be configured as a pair of latches—an input latch (coupled to the drive) and a multiplexer latch. Similarly, the write data path comprises a multiplexer latch (coupled to the data bus) and an output latch coupled to the drive. Preferably, however, each set of four latches is compressed into a pair of bidirectional latching transceivers to save parts.

Figure 6:
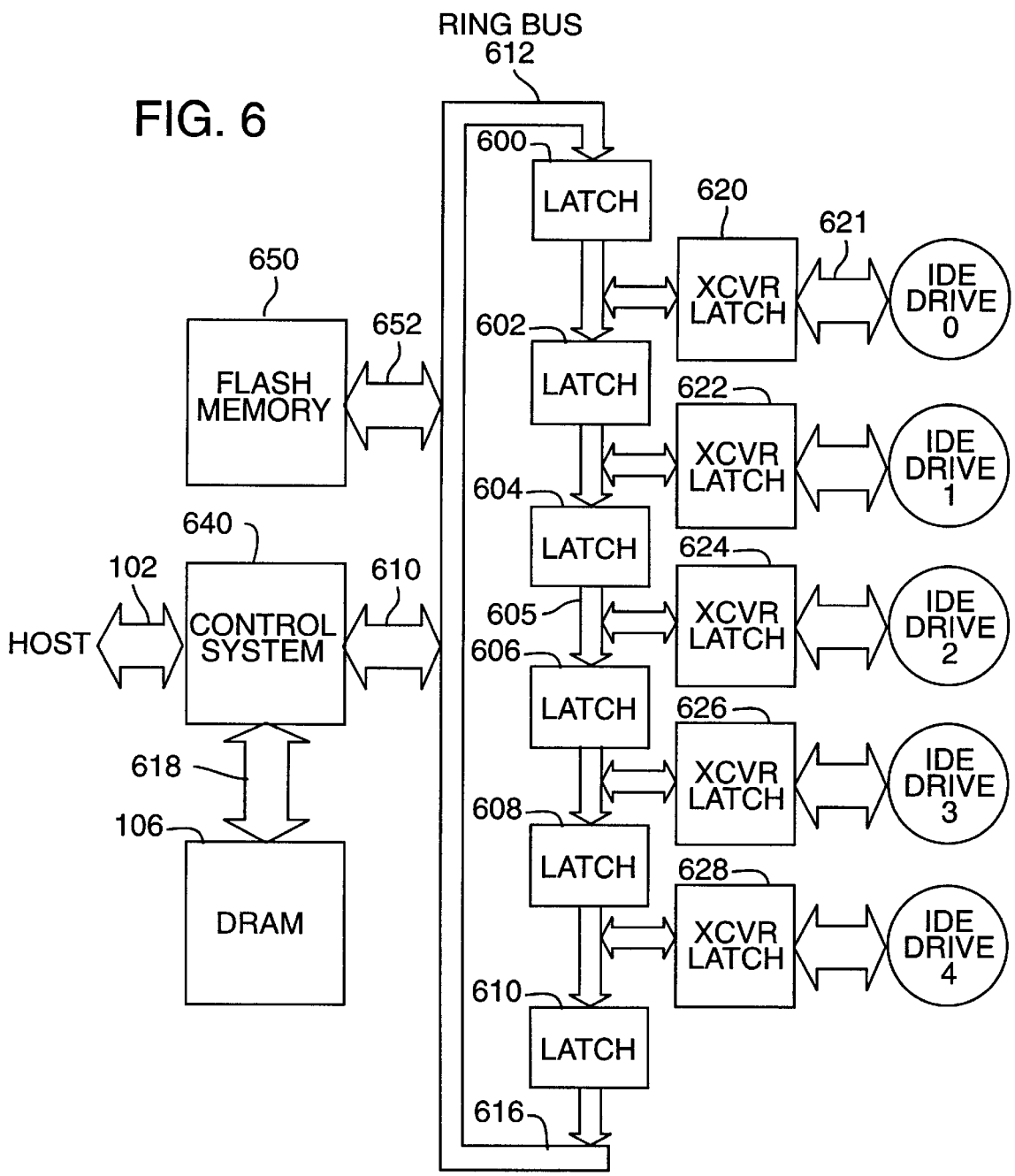
FIG. 6 is a hardware block diagram illustrating a disk drive array system utilizing a ring structure multiplexed data bus.

An alternative disk array controller is illustrated in FIG. 6. In that arrangement, a plurality of latches 600, 602, 604, 606 and 608 are arranged serially so as to form a ring bus structure. One latch is provided for each disk drive, plus one additional latch 610 between the last drive (drive 4) and the control system circuitry (the data bus). Note that these latches 600–610 must be edge clocked; transparent latches will not work. Each latch in the ring has a tri-state output port coupled to the input port of the next latch in the ring. For example, the output port of latch 604 is coupled to the input port 605 of latch 606. The system is controlled by a control system 640 described in greater detail below. The control system 640 includes a port 610 which is coupled to the ring bus 612. Control system 640 also includes a port on the host bus 102. It further includes a buffer memory port 618 for transferring data to and from the RAM buffer 106. While the RAM buffer 106 is described primarily with reference to buffering read and write data, the same memory, preferably DRAM, can be used for storing microcode for execution in the control system 640, and a portion of the DRAM is likely to be used as cache in connection with disk drive read operations. Particulars of disk caching operations are known in the prior art and are outside the scope of the present invention.

Another memory 650 is non-volatile memory, preferably flash memory. Flash memory, while non-volatile, has the added advantage of being writable in-system. The flash memory 650 can be used to store microcode for operation of a microprocessor in the control system 640, and can be used for logging disk drive statistics. For example, it can be used to log errors that are detected in reading or writing any of the drives, as well as tracking installation and removal of particular disk drives. The flash memory 650 is coupled through data port 652 to the ring bus 612. This arrangement allows for transfers between the control system 640, the flash memory 650 and the DRAM buffer 106. For example, microcode stored in the flash memory 650 can be loaded into the DRAM 106 when the system is initialized thereby allowing faster operation of microprocessor disposed in the control system 640. In a presently preferred embodiment, the control system 640 would be implemented in a single integrated circuit, including an on-board RISC processor.

The configuration shown in FIG. 6 has the advantage of using a common clock to shift the ring and a common output enable for the elements of the ring. This configuration eliminates the need for N+1 staggered strobes to multiplex read data and to demultiplex write data and minimizes the number of pins on such an integrated circuit, control system 640, without compromising speed or expendability. For example, additional disk drives can be deployed, simply by expanding the size of the ring bus 612, i.e. by adding an additional latch and additional latching transceiver for each additional disk drive. Note that each latch drives only the following latch (and the corresponding latching transceiver) regardless of the size of the ring, so loading is not an issue. The multiplexing ring (or the multiplexing latches previously shown) also provides a data path from the control circuitry 640 to the drives for command and status information. While the drive read and write strobes are common, each drive interface has a unique chip select signal. To broadcast commands or transfer data, all chip selects are asserted during the strobe. To read the status of any one drive to direct commands to a single drive as might be required for error recovery or other purposes, individual chip selects may be asserted. Preferably, the number of drives is equal to $2^N+1$, including a redundant drive. Having the number of primary or non-redundant drives equal to a power of 2 simplifies mapping striped data both into and out of the DRAM buffer. In the presently preferred design, all of the circuitry shown in FIG. 6, except for the disk drives themselves, are deployed on a single circuit board. The boards can be configured for mechanical compatibility, and the control system 640 programmed for logical compatibility, with known computers, such as the ubiquitous "personal computer". The circuit board further includes a connector, for example, connector 621, for each disk drive to be attached to the described controller board. In this illustration, IDE drives, 0–4 are shown, one of which would be designated as a redundant drive. The invention, however, is equally applicable to SCSI drives, in which case a SCSI controller would be connected to each drive port instead of an IDE drive. Additionally, the control system 640 can be programmed to interface with various host bus architectures, such as the 32-bit VESA bus and 32-bit or 64-bit PCI, etc.

Each of the drives is coupled to a bidirectional latching transceiver, shown as latching transceivers 620, 622, 624, 626 and 628. One such device, called a CMOS 16-bit bus transceiver/register, is commercially available from Integrated Device Technology, Inc. IDT 54/74 FCT 16652T. (That device is edge clocked.) The IDT device is organized as two independent 8-bit bus transceivers with three-state D-type registers. In this regard, we refer to each latching transceiver as having two ports. In each transceiver, the first port is connected to a corresponding one of the disk drives, for example, latching transceiver 620 has a first port 621 coupled to IDE drive 0. The second port in each latching transceiver is coupled to a different "node" on the ring bus 612. The second port of latching transceiver 620 is coupled at the input to latch 602. The second port of latching transceiver 622 is coupled to the input of latch 604, etcIn the preferred embodiment illustrated, there is one latch on the ring per drive and plus one latch coupling the last drive to the control system. The control system 640 is arranged to execute synchronous, multiplexed data transfer between the memory buffer 106 and the ring 616 by serially shifting data around the ring. The ring bus 612 can be operated at the control system 640 processor speed, for example 66 MHZ. For each clock cycle, one word of data is transferred from the memory buffer 106 through the control system port 610 onto the ring bus 612. At each clock cycle, a word of data is transferred from one latch to the next, much like a shift-register. Thus, in the example illustrated, over the course of 5 clock cycles, 4 words of data are moved from the memory buffer 106 into the latches 602, 604, 606, 608. A fifth word consisting of redundant data is synthesized and held in latch 600. Once the data is in the correct position, it is broadside loaded (i.e., in a single clock cycle) into the latching transceivers 620–628. The latching transceivers then hold the data at the drive port (e.g., 621) while it is written into the disk drive. In the meantime, since the latching transceivers isolate the ring of latches from the disk drive interface, the control system 640 proceeds to reload the ring with the next 5 words of write and redundant data. Preferably, the control system/DRAM operates at N times the speed of each disk drive, where N is the number of drives. In this way, the time it takes to fill the ring with data is approximately the same as the time it takes to write the data from the latching transceivers into the drive. The result is synchronous operation at data rates approximately equal to N times the individual data rate of a single drive.

Figure 14:
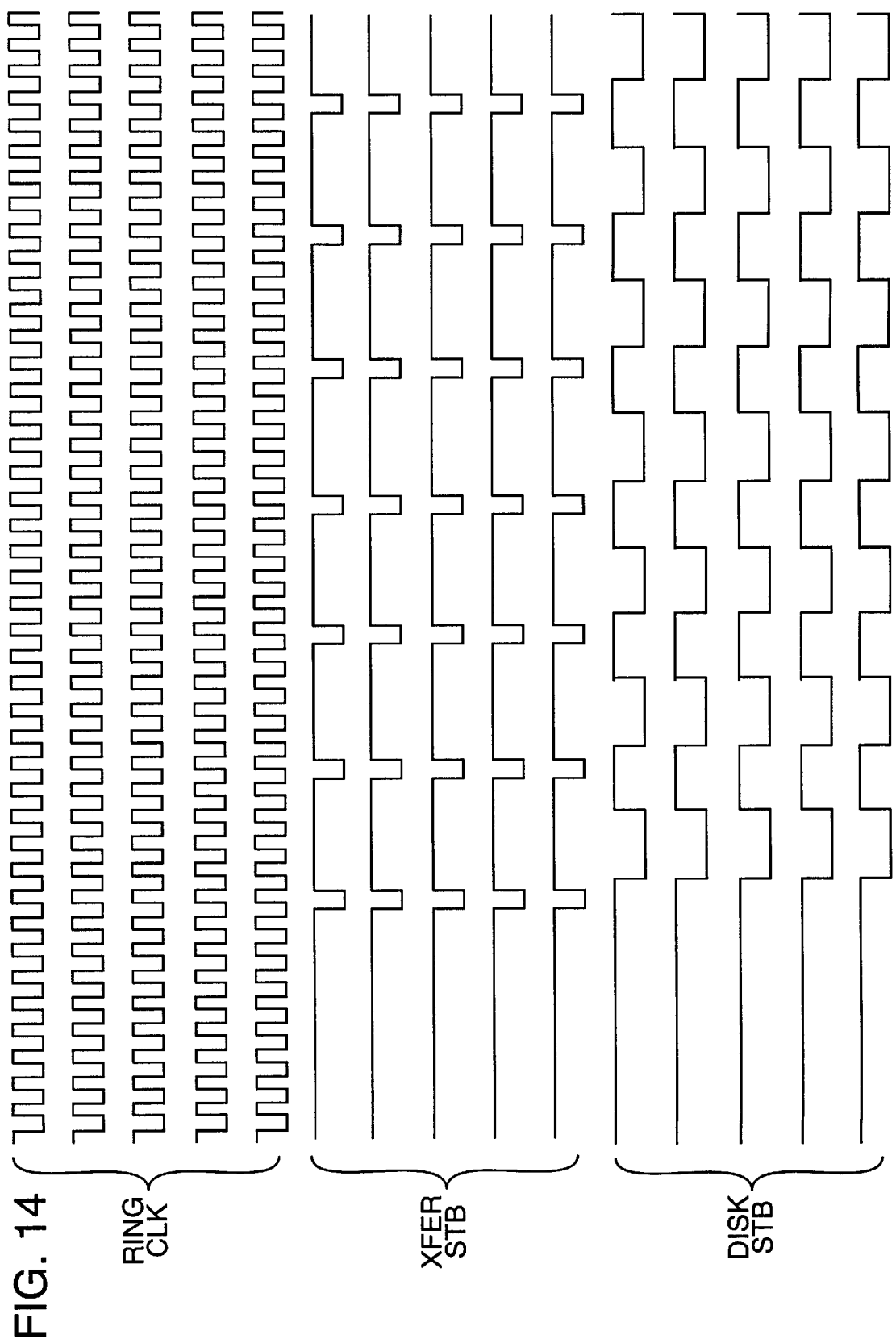
FIG. 14 is a timing diagram illustrating operation of a ring structure drive data bus of the type illustrated in the example of FIG. 6.

The foregoing operation is further illustrated by the timing diagram of FIG. 14, in which five RING CLOCK signals are shown—one for each of the ring latches. Since they are identical, however, a single ring clock signal is sufficient. After five ring clock cycles to "load" the ring as described above, five "XFER STB" (transfer strobe) signals are asserted simultaneously to broadside transfer the write data from the ring latches (600–608 in FIG. 6) into the corresponding latching transceivers (620–628 in FIG. 6). Again, a single transfer strobe is preferred. Finally, the "DISK STB" (disk strobe) signals write the data from the latching transceivers into the corresponding disk drives. Again, since all five drives are synchronized, a single drive strobe is preferred to simplify wiring and reduce pin count. While the data is being transferred and written to disk, the next five cycles of the ring clock are loading the next word into the ring; the RAM addressing being directed by the single channel DMA as before. This process is repeated until the write command is completed. A read operation proceeds in the opposite direction but in analogous fashion so it need not be described in detail.

Redundant Checkword Computations

Figure 7:
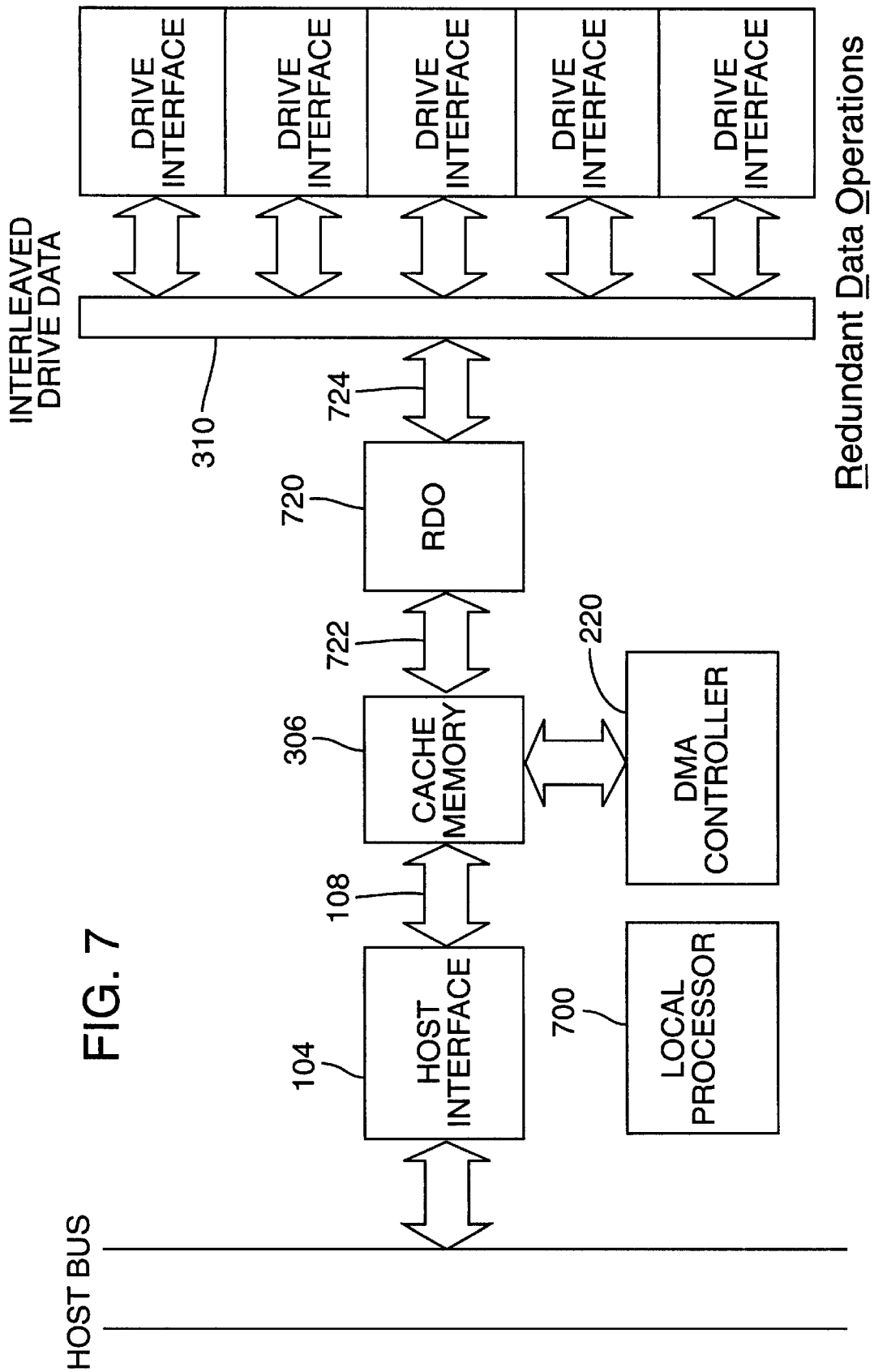
FIG. 7 is a hardware block diagram illustrating a disk drive array system with redundant data processing according to another aspect of the invention.

FIG. 7 is another illustration of a disk controller apparatus arranged for synchronous data transfer. This arrangement is similar to that described above with reference to FIGS. 2 and 6. This figure shows, in addition, a block 720 marked "RDO" (redundant data operations) which is coupled to the cache memory buffer 306 via bus 722 and is coupled to the drive data bus 310 via bus 724. Thus the RDO Block 720 is in the data path between the drives and the memory buffer. RDO block 720 represents a means for generating redundant data during a write operation and, conversely, reconstructing any missing data from redundant data during a read operation. RDO block 720 includes circuitry that operates under control of the local processor 700 as further described below.

Figure 8:
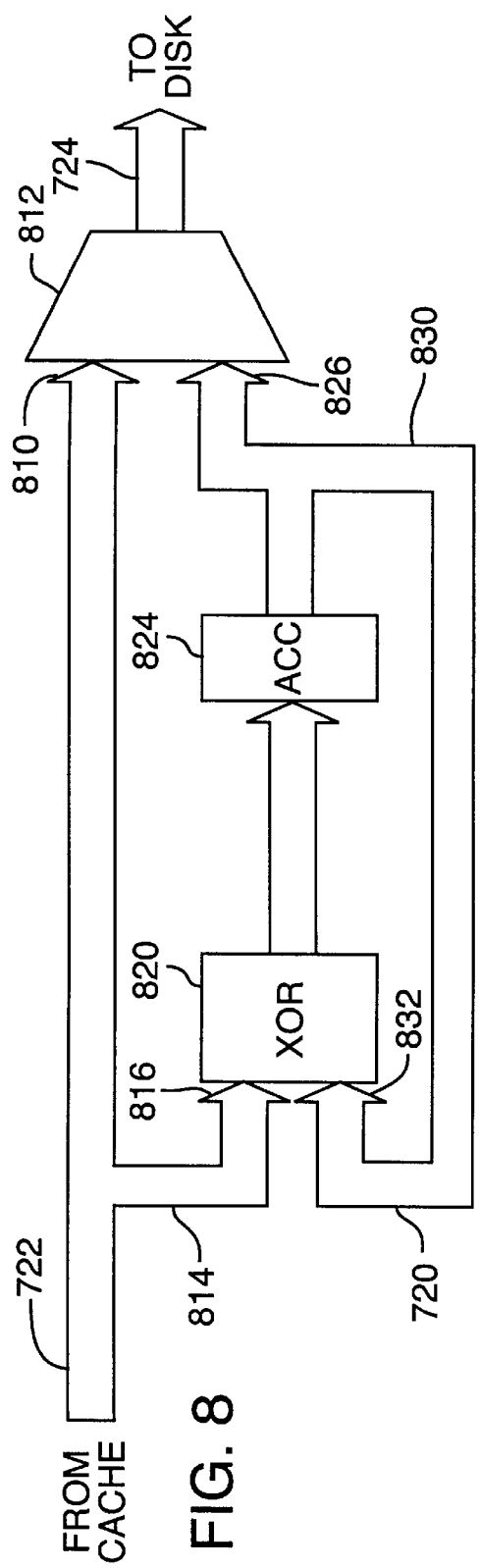
FIG. 8 is a simplified schematic diagram illustrating circuitry for forming redundant check data "on the fly" in a RAID buffer data path.

FIG. 8 illustrates one implementation of RDO circuitry for generating redundant check data on the fly during execution of a disk write operation. Referring to FIG. 8, write data from the buffer on bus 722 is directed to a first input 810 of a multiplexer 812. The output of mux 812 is coupled to the drives via bus 724. The write data on bus 722 also is directed via path 814 to a first input 816 of an XOR circuit 820. The output of XOR 820 is directed via 822 to an accumulator 824. The output of accumulator 824 is coupled to the second input 826 of multiplexer 812 and also is coupled via feedback path 830 to the second input 832 of XOR 820. The XOR thus generates the logical exclusive-OR function of the accumulator contents and the incoming data on bus 722. The result is stored in accumulator 824.

In operation, a first word of write data is directed to the disk drives via bus 722 and multiplexer 812. At the same time, the first word of data is loaded through XOR 820 into accumulator 808 (the accumulator having been cleared previously). The next word of write data is directed via bus 722 and multiplexer 812 to the next disk drive in the array. At the same time, the second word of write data is XORed in circuit 820 with the first word (previously stored in the accumulator). This process is repeated, each new word of write data being XORed with the previous XOR result, until the corresponding words of write data have been stored in each of the disk drives except for the redundant drive. Then multiplexer 812 is switched so as to direct the contents of accumulator 824 to the output bus 724 for storing that word—the redundant check word—in the redundant drive. This process is conducted "on the fly" as the data passes from the RAM buffer to the drives. The relative simplicity of the circuit derives from the fact that the multiplexed data is interleaved by word and that each word of redundant write data may be stored on the drive as soon as it is computed. In the prior art, as noted above, the redundant data is computed during a second pass through the buffer by a local processor or state machine, during which all of the data may be accessed in order for the purpose of the computation. That second pass through the data slows the write process considerably in the prior art. Returning to the circuitry of FIG. 8, the XOR/LOAD circuit and multiplexer 812 are controlled by a simple counter or state machine (not shown), arranged to count modulo the number of drives.

Figure 9:
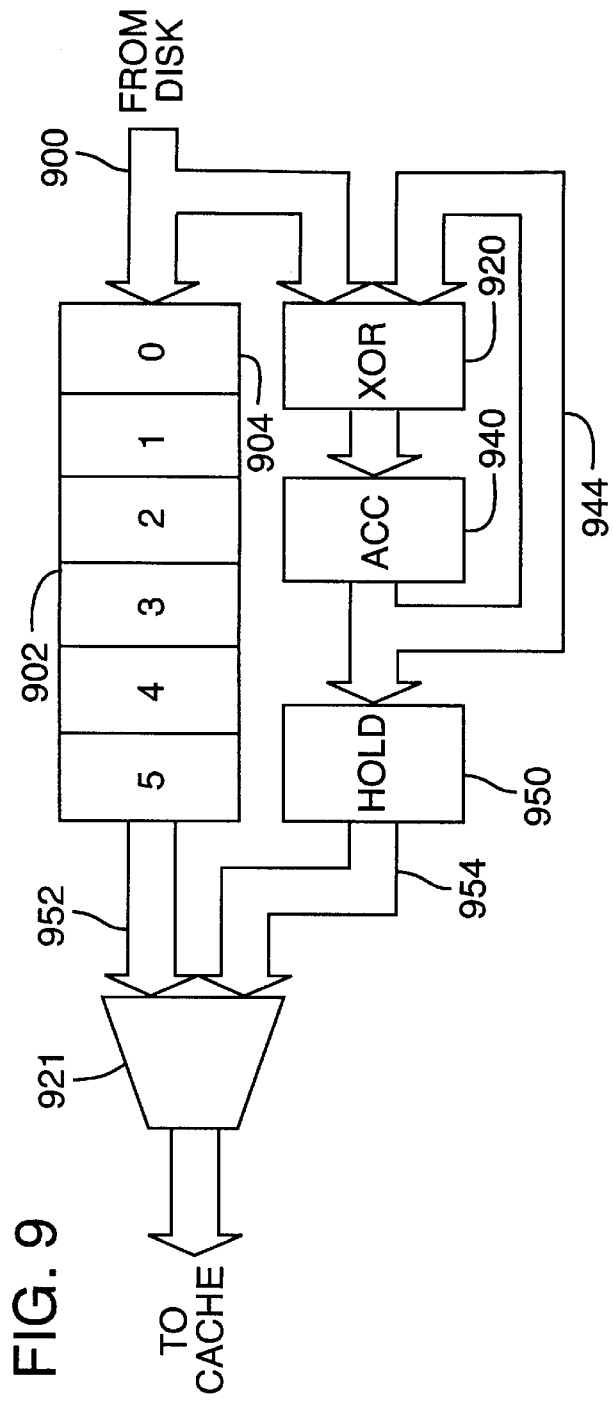
FIG. 9 is a simplified schematic diagram illustrating circuitry for reconstructing missing data from redundant check data "on the fly" in a RAID buffer data path.

FIG. 9 illustrates circuitry for reconstructing missing data during a disk read operation. The processor (700 in FIG. 7) includes two registers where it stores the number of drives in the array and the identity of any detected bad drive. Thus the identity of a bad drive is known in advance of starting a read operation. The processor will use the circuitry of FIG. 9 to reconstruct the data stored in the bad drive during the read operation as follows. In FIG. 9, word-serial read data from the disk drives is received via bus 900 into a data pipeline 902. Pipeline 902 comprises at least N+1 stages of registers where N is the total number of disk drives. In this example, assuming a total of five disk drives, pipeline 902 has 6 stages, numbered 0–5 in the direction of data flow, the first stage being stage 904. Data flows out of the pipeline 902 via path 952 into a first input to multiplexer 921 and then to the cache or buffer memory.

Read data from the disk drives on bus 900 also is input into a first input of an XOR circuit 920. The XOR provides the boolean exclusive-OR function of the input data word from bus 900 and the contents of an accumulator 940 via feedback path 944. The XOR results are held in the accumulator for the next computation. The accumulator contents also are input to a hold latch 950 which in turn provides the data via path 954 to a second input to multiplexer 921. Thus multiplexer 921 selects data from either the pipeline path 952 or the XOR/accumulator path 954. All of the data paths in FIG. 9 are word wide in a preferred embodiment, i.e. the same width as each disk drive data port. Accumulator 940 is capable of executing at least the following functions: LOAD, HOLD, and CLEAR. Operation of the apparatus of FIG. 9 is described in greater detail with reference to the state table of FIG. 10.

Referring now to FIG. 10, the state table shows a repeating sequence of five clock states, numbered 0–4. Data words are identified as a letter and number combination, in which the letter corresponds to one of the disk drives in the array, and the number indicates a word of read data. In this illustration, there are a total of five disk drives, A–E. At clock state 0, input word A0 is loaded into the accumulator 940 and into the first stage (904 in FIG. 9) of the data pipeline 902. On the next clock, state 1, the next word of data, B0, is loaded into pipeline stage 0, and word A0 moves into pipeline stage 1. The XOR calculates the XOR A0+B0. On the next clock state, 2, the next word C0 is clocked into the pipeline stage 0 and the XOR determines the exclusive-OR of the new word C0 with the prior result, i.e., A0+B0+C0. At each new clock state, read data moves one more stage through the pipeline from right to left, and the XOR determines the exclusive OR of the new data with the previous results held in the accumulator, so that it determines (A0+B0+C0+D0+E0) on clock state 4. At that time, pipeline stages 0–4 have been loaded. On the next clock state 0, the accumulator loads the next word A1 and the previous value A0+B0+C0+D0+E0 is stored in the hold latch 950. The next word of read data A1 is loaded into the accumulator 940 and into the first stage 0 of pipeline 902. The process described above then proceeds with clocking data through the pipeline. It may be observed that the read data appears at the output at the full clock rate, once the pipeline is filled, except for one clock cycle gaps corresponding to the redundant drive E. Output is taken from the pipeline via path 952 and multiplexer 921 in FIG. 9. This illustration assumes that all of the drives are functioning.

FIG. 11 is a state table illustrating operation of the apparatus of FIG. 9 in the event that a correction of read data is required. In general, the state table of FIG. 11 shows the flow of read data through the pipeline as before. In this illustration, however, drive B is bad, so its data must be reconstructed from the data on the other drives. First word A0 is loaded as before. A "bad drive" signal from the processor directs the accumulator to hold its present contents A0 instead of loading bad data from drive B. The bad data is loaded into the pipeline, however, as shown in the table. Referring to clock state 2, input C0 is loaded into the pipeline, and the accumulator determines the XOR function A0+C0. Read operation from drives D and E proceed during clock states 3 and 4, respectively, as before. Accordingly, the read data is clocked through the pipeline, including the bad data from drive B. At state 4, the accumulator holds the value of A0+C0+D0+E0. In other words, the accumulator has determined the XOR function of all of the data except the bad or missing data. This value is the reconstructed missing data—word B0.

At the next clock state 0, the next word A1 is loaded into the accumulator, and the previous accumulator contents are stored in the hold latch. A1 also is clocked into the pipeline. In the next clock state 1, again the bad drive flag is asserted since another attempt is made to read from drive B. The accumulator therefore holds its current value A1, while data again moves to the next stage through the pipeline. At this point, the first read data A0 appears at the output (930 in FIG. 9). At the next clock state 2, data C1 is loaded into the pipeline and the accumulator determines the XOR or A1+C1. At this time, read data B0 should be provided at the output. Since drive B is bad, the "B0" data in the pipeline is undetermined (xxx). The control system switches multiplexer 921 so as to direct the contents of hold latch 954 into the output latch 930 instead of the pipeline contents. Thus, the value A0+C0+D0+E0 is inserted to provide the read data B0. In this way, the missing or bad data is reconstructed from the valid and redundant data "on the fly" i.e., without requiring an additional pass through the data in the buffer to reconstruct the missing data. The circuitry illustrated in FIG. 9 operated as shown in FIG. 11 generates and substitutes the correct data into the read data stream in real time. In this approach, as contrasted with the prior art, bad data is never written into the cache buffer. Rather, it is corrected en route, as indicated by the RDO block 720 in FIG. 7. Clocking illustrated in the state tables can be provided, for example, by a state machine counting modulo the number of drives in the array.

Figure 12:
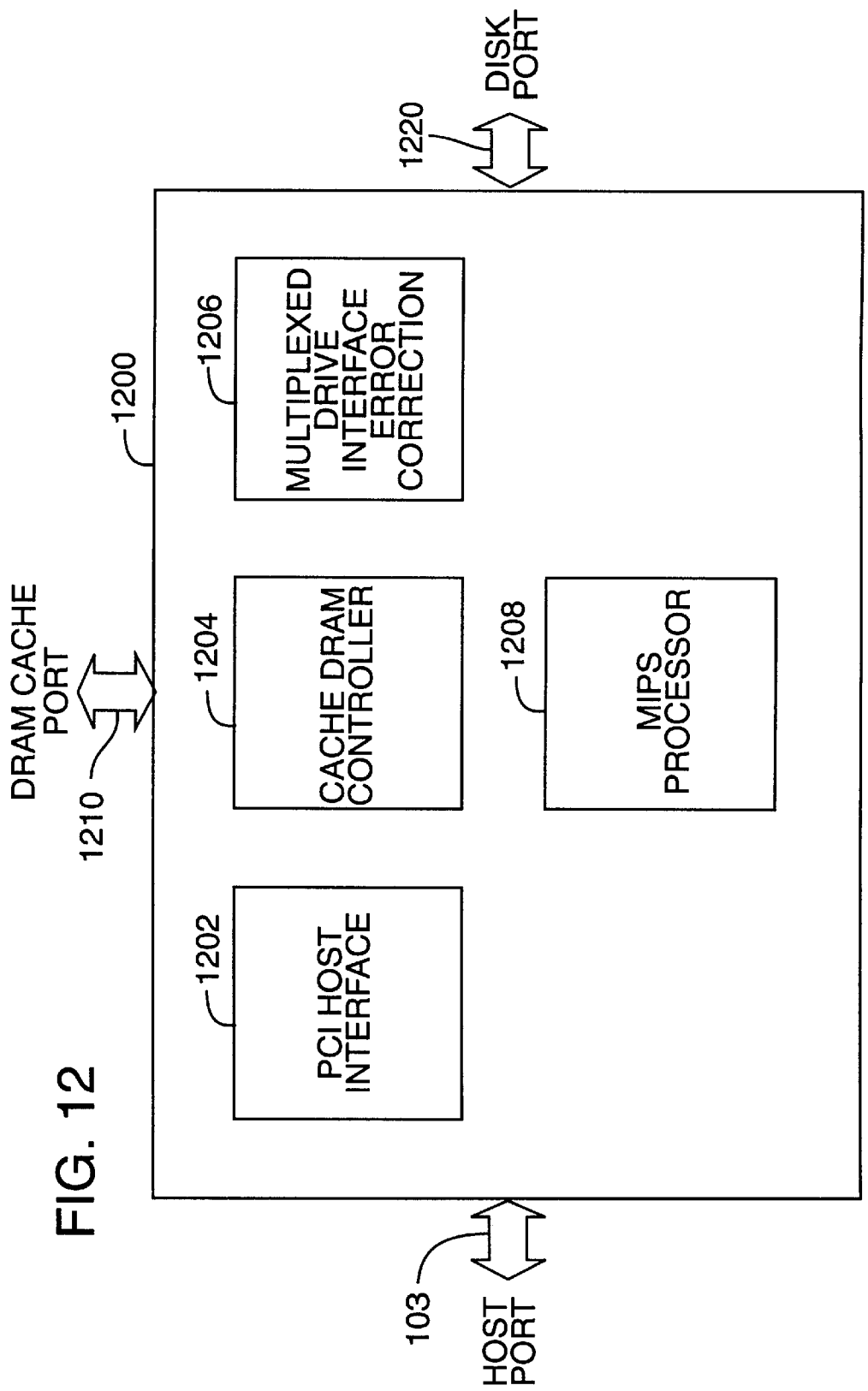
FIG. 12 is a functional block diagram illustrating a presently preferred embodiment of a disk array controller integrated circuit implementation of the present invention.
Figure 13:
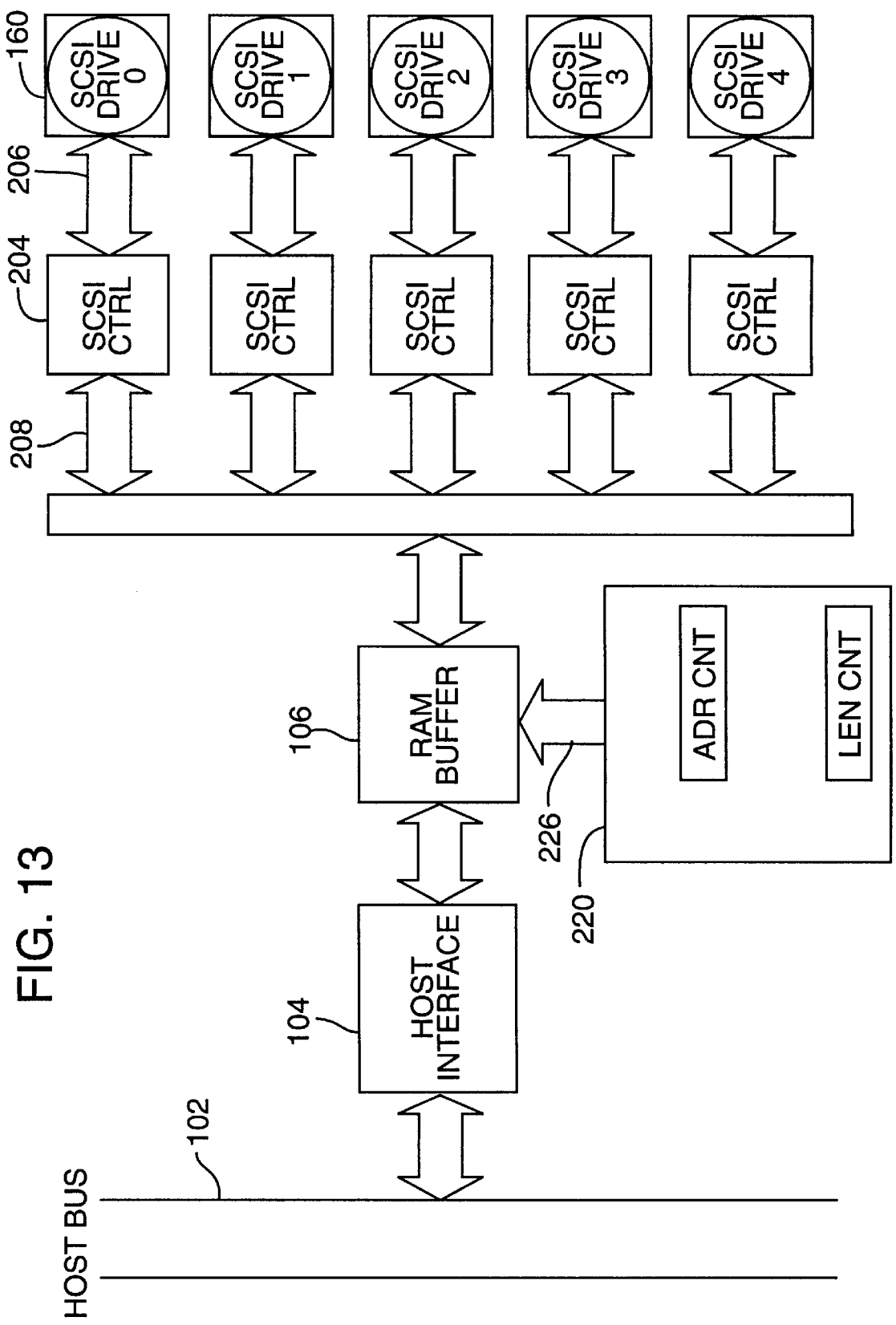
FIG. 13 is a hardware block diagram illustrating an alternative embodiment of the invention as applied to an array of SCSI drives.

In a presently preferred commercial embodiment, a new disk array controller chip is implemented as indicated in the block diagram of FIG. 12. The proposed controller chip 1200 includes a PCI host interface 1202, a cache DRAM controller 1204, a multiplexed drive interface apparatus with error correction 1206, and a RISC processor, such as a MIPS processor 1208, all of which can be implemented in CMOS technology. The chip 1200 includes a host port 102 as described previously. A DRAM port 1210 is used for connection to DRAM memory. The DRAM memory can be used for buffering data, as described above. It can also be used for storing microcode executable by the processor 1208, where the code is stored off chip, for example in EPROM, EEPROM or flash memory. The multiplexed drive interface circuitry 1206 is used for connecting the chip to an array of disk drives through the disk port 1220 using multiplexing strategies, for example as illustrated in FIG. 3 or the ring bus as illustrated in FIG. 6.

While the present invention has been described by means of the preferred embodiment, those skilled in the art will recognize that numerous modifications in detail are possible without departing from the scope of the claims. For example, substitution of hardware circuitry for equivalent software implemented functions, and vice versa, is known in electrical engineering and would not depart from the scope of the invention. The following claims are intended to be interpreted to include all such modifications.

What is claimed is:

1. A method of reading striped digital data from a RAID array of disk drives, each drive having a respective data port of predetermined width coupled to an internal buffer, the method comprising the steps of:

providing a single buffer memory having a data port coupled to all of the disk drive data ports for transferring digital data;

providing a series of registers forming a common pipeline disposed in between the disk drive data ports and the buffer memory data port;

providing a single address counter for addressing consecutive locations in the buffer memory;

sending read commands to all of the disk drives so as to initiate read operations in all of the disk drives;

waiting until read data elements are ready at all of the disk drive data ports;

after read data elements are ready at all of the disk drive data ports, synchronously retrieving and storing the read data elements from all of the disk drive data ports into consecutive locations in the buffer memory under addressing control of the single address counter;

wherein said synchronously retrieving and storing the read data elements from all of the disk drive data ports includes clocking the read data through the common pipeline so as to form a contiguous word serial data stream through the pipeline;

concurrently computing redundant data from the read data while the read data moves through the pipeline;

and, if a failed drive has been identified, substituting the computed redundant data into the word serial data stream in lieu of the failed disk drive data so as to form corrected read data; and storing the corrected read data into the buffer memory thereby providing the requested read data without incurring delay to reconstruct data stored on the failed disk drive and without storing erroneous data in the buffer memory.

2. A RAID disk array controller comprising:

host bus interface means for interfacing to a host bus for data transfer;

buffer memory means for storing data;

a processor for controlling operation of the disk controller so as to effect synchronous data transfers between the buffer memory and an array of disk drives;

disk drive interface means including a drive data bus for interfacing the controller to an array of disk drives including a redundant drive;

redundant data operating means disposed along the drive data bus for forming redundant drive data on the fly as data passes from the buffer memory to the drives during a disk write operation.

3. A disk array controller according to claim 2 wherein the redundant data operating means includes:

a multiplexer having a first input coupled to the buffer memory port to receive write data;

an XOR/LOAD circuit having a first input coupled to the buffer memory port;

an accumulator coupled to the output of the XOR/LOAD circuit;

a feedback path from the accumulator circuit to a second input of the XOR/LOAD circuit;

the multiplexer having a second input coupled to the accumulator; and the multiplexer output coupled to the drive data bus for interfacing to the array of disk drives, so that in operation the multiplexer selects either a word of write data from the buffer memory for writing to disk, or a redundant word formed in the accumulator for writing to disk as redundant data.

4. A disk array controller according to claim 2 further comprising second redundant data operating means disposed along the drive data bus for reconstructing missing data on the fly as data passes from the drives to the buffer memory during a disk read operation, so that in operation a single-drive failure does not cause loss of data or delay in providing requested read data to the buffer memory.

5. A disk array controller according to claim 4 wherein the second redundant data operating means includes:

a pipeline of registers through which read data is passed during a disk read operation;

an input end of the pipeline coupled to the disk drive data bus to receive read data;

a multiplexer having a first input coupled to an output end of the pipeline to receive read data;

an XOR circuit coupled to the disk drive data bus to receive read data;

an accumulator having an input coupled to the XOR circuit output;

a holding circuit having an input coupled to the XOR circuit output;

a holding circuit having an input coupled to the accumulator to hold accumulated data;

a feedback path from the output of the accumulator to a second input of the XOR circuit for forming XOR data in the accumulator as valid read data passes through the XOR circuit from the drive data bus;

an output path from the hold circuit to a second input of the multiplexer to provide reconstructed missing data;

wherein the multiplexer output is coupled to the buffer memory so that in operation, for each read strobe, the multiplexer selects either a word of valid read data from the pipeline for writing to the buffer memory, or a reconstructed word formed in the accumulator for writing to the buffer memory in lieu of missing or bad data.

6. A disk array controller apparatus comprising:

a buffer memory (106);

disk drive interface means (204) for connection to a plurality of disk drives;

a data bus (310) interconnecting the buffer memory and the disk drive interface means;

control means (1200) coupled to the buffer memory and coupled to the data bus for synchronously transferring data over the data bus between the buffer memory and the interface means to effect disk read and disk write operations, wherein the control means includes only a single DMA channel for addressing the buffer memory; and means disposed between the buffer memory and the data bus for generating redundant check data on the fly during execution of a disk write operation.

7. A disk array controller apparatus comprising:

a buffer memory (106);

disk drive interface means (204) for connection to a plurality of disk drives;

a data bus (310) interconnecting the buffer memory and the disk drive interface means;

control means (1200) coupled to the buffer memory and coupled to the data bus for synchronously transferring data over the data bus between the buffer memory and the interface means to effect disk read and disk write operations, wherein the control means includes only a single DMA channel for addressing the buffer memory; and means disposed between the buffer memory and the drive data bus for reconstructing missing data during a read operation so that only correct read data is stored in the buffer memory.

8. A disk array controller apparatus according to claim 7 wherein the data reconstructing means includes a pipeline of registers arranged for transferring word serial read data from the data bus to the buffer memory.

9. A disk array controller apparatus according to claim 8 wherein the pipeline includes a number of stages equal to N+1, where N is the total number of said disk drives in the array, each stage in the pipeline having a number of bits equal to a number of bits in the drive data bus.

10. A method of writing digital source data stored in a buffer to a RAID array of N disk drives numbered 0 to (N−1), each disk drive having a like drive port including a data bus of predetermined width, the method comprising the steps of:

sequentially reading the source data from a contiguous block of memory locations in the buffer, thereby forming a serial stream of source data;

selecting a data element size equal to an integer multiple of the data bus width of the drive port;

striping the source data read from the buffer by the selected data element size across the drives by writing an xth data element of the source data to drive (x mod N).

11. A method of writing to a RAID array according to claim 10 and further comprising:

providing an additional drive number N+1;

computing redundant data in response to the serial stream of source data;

writing the redundant data to the N+1 drive.

12. A method of writing to a RAID array according to claim 11 wherein said computing step includes determining a redundant data element in response to each N data elements of the serial stream of source data.

13. A method of writing to a RAID array according to claim 12 wherein the redundant data element consists of the boolean XOR function of the corresponding N data elements.

14. A method of writing to a RAID array according to claim 10 wherein the data bus width of the drive port is 16 bits.

15. A method according to claim 10 wherein the selected data element size is 16 bits.

16. A method of writing digital source data stored in a buffer to a RAID array of N+1 disk drives numbered 0 to N, comprising the steps of:

sequentially reading the source data from a contiguous block of memory locations in the buffer, thereby forming a single, serial stream of source data having a transfer rate;

synchronously forming redundant data responsive to the serial stream of data at the same transfer rate as the serial stream of data;

inserting the redundant data into the serial stream of data; and writing the resulting serial stream of data in striping fashion to the N+1 disk drives.

17. A method according to claim 16, each disk drive having a like drive port including a data bus of predetermined width, further comprising selecting a data element size equal to an integer multiple of the data bus width of the drive port; and wherein:

said step of synchronously forming redundant data includes determining a single redundant data element in response to each N data elements of the serial stream of source data;

said step of inserting the redundant data into the serial stream of data consists of inserting each redundant data element into the serial stream as a next data element immediately following the N data elements used to form the said redundant data element; and said writing step includes striping the resulting serial stream of data, including the redundant data, by the selected data element size across the drives whereby the redundant data elements are stored on drive N+1.

18. A method according to claim 16 wherein the selected data element size is 16 bits.

19. A method according to claim 16 wherein the selected data element size is 32 bits.

* * * * *